US012499814B2

(12) United States Patent
Seo et al.

(10) Patent No.: US 12,499,814 B2
(45) **Date of Patent: *Dec. 16, 2025**

(54) DISPLAY DEVICE

(71) Applicant: SAMSUNG DISPLAY CO., LTD., Yongin-si (KR)

(72) Inventors: Hae Kwan Seo, Yongin-si (KR); Won Tae Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,875

(22) Filed: Aug. 15, 2022

(65) Prior Publication Data

US 2022/0392397 A1 Dec. 8, 2022

Related U.S. Application Data

(63) Continuation of application No. 16/832,254, filed on Mar. 27, 2020, now Pat. No. 11,417,265.

(30) Foreign Application Priority Data

Jul. 29, 2019 (KR) ........................ 10-2019-0091893

(51) Int. Cl.
*G09G 3/22* (2006.01)
*G09G 5/14* (2006.01)

(52) U.S. Cl.
CPC ................. *G09G 3/22* (2013.01); *G09G 5/14* (2013.01); *G09G 2300/0809* (2013.01); (Continued)

(58) Field of Classification Search
CPC .... G09G 3/22; G09G 5/14; G09G 2300/0809; G09G 2310/0267; G09G 2310/027; (Continued)

(56) References Cited

U.S. PATENT DOCUMENTS 7,304,631 B2 12/2007 Morita et al.
9,069,521 B2 6/2015 Lee et al.
(Continued)

FOREIGN PATENT DOCUMENTS

CN 1835062 A 9/2006
CN 106205449 A 12/2016
(Continued)

OTHER PUBLICATIONS

English Translation of CN 108682392 (Year: 2018).
(Continued)

*Primary Examiner* — Patrick N Edouard
*Assistant Examiner* — Eboni N Giles
(74) *Attorney, Agent, or Firm* — Womble Bond Dickinson (US) LLP

(57) ABSTRACT

A display device includes a display including scan lines, data lines, light emission control lines, and pixels connected thereto, a scan driver configured to sequentially provide scan signals to the scan lines, a data driver configured to provide data signals to the data lines, a light emitting driver configured to provide light emission control signals to the light emission control lines based on a light emission clock signal having pulses, and a timing controller configured to provide the light emission clock signal to the light emitting driver, to output the pulses of the light emission clock signal during a frame in a first mode, to mask at least one pulse of the pulses during a first period of the frame in a second mode, and to output at least another pulse of the pulses during a second period after the first period.

19 Claims, 20 Drawing Sheets

(52) U.S. Cl.
CPC ............... *G09G 2310/0267* (2013.01); *G09G 2310/027* (2013.01); *G09G 2310/0291* (2013.01); *G09G 2310/04* (2013.01); *G09G 2310/08* (2013.01); *G09G 2320/064* (2013.01); *G09G 2340/16* (2013.01); *G09G 2380/02* (2013.01)

(58) Field of Classification Search
CPC ....... G09G 2310/0291; G09G 2310/04; G09G 2310/08; G09G 2320/064; G09G 2340/16; G09G 2380/02
See application file for complete search history.

(56) References Cited

U.S. PATENT DOCUMENTS

| | | | |
|---|---|---|---|
| 9,524,690 | B2 | 12/2016 | Lim et al. |
| 9,830,855 | B1 | 11/2017 | Li |
| 9,959,030 | B2 | 5/2018 | Sang et al. |
| 10,614,732 | B2 | 4/2020 | Choi et al. |
| 11,532,277 | B2 * | 12/2022 | Nishio ................. G09G 3/3275 |
| 2008/0001861 | A1 | 1/2008 | Asano et al. |
| 2015/0339967 | A1 | 11/2015 | Shin |
| 2016/0111055 | A1 | 4/2016 | Na et al. |
| 2016/0351160 | A1 | 12/2016 | In et al. |
| 2017/0124958 | A1 | 5/2017 | Pyo et al. |
| 2017/0186378 | A1 | 6/2017 | Na et al. |
| 2017/0193890 | A1 * | 7/2017 | Kim ..................... G09G 3/2092 |
| 2017/0287425 | A1 * | 10/2017 | Koo ......................... G09G 5/18 |
| 2019/0180689 | A1 * | 6/2019 | Chen ........................ G09G 3/30 |
| 2020/0258452 | A1 | 8/2020 | Feng et al. |
| 2021/0027697 | A1 | 1/2021 | Yoon et al. |
| 2021/0407425 | A1 * | 12/2021 | Huang ................. G09G 3/3266 |

FOREIGN PATENT DOCUMENTS

| | | | |
|---|---|---|---|
| CN | 106652905 | A | 5/2017 |
| CN | 108269517 | A | 7/2018 |
| CN | 108461065 | A | 8/2018 |
| CN | 108682392 | A | 10/2018 |
| EP | 3 193 323 | A2 | 7/2017 |
| KR | 10-2015-0086973 | A | 7/2015 |
| KR | 10-2016-0108705 | A | 9/2016 |
| KR | 10-2017-0121378 | A | 11/2017 |
| KR | 10-1910111 | B1 | 10/2018 |

OTHER PUBLICATIONS

Chinese Office Action dated Feb. 27, 2025, issued in corresponding Chinese Patent Application No. 202010716330.6, 9 pages.

* cited by examiner

DISPLAY DEVICE

CROSS-REFERENCE TO RELATED APPLICATIONS

This application is a continuation of U.S. patent application Ser. No. 16/832,254, filed Mar. 27, 2020, which claims priority to and the benefit of Korean Patent Application No. 10-2019-0091893, filed Jul. 29, 2019, the entire content of both of which is incorporated herein by reference.

BACKGROUND

1. Field

Embodiments of the present disclosure relate to a display device.

2. Description of the Related Art

A display device includes a display panel and a driver. The display panel includes scan lines, data lines, light emission control lines, and pixels. The driver includes a scan driver that sequentially provides scan signals to the scan lines, a light emitting driver that sequentially provides light emission control signals to the light emission control lines, and a data driver that provides data signals to the data lines. Each of the pixels may emit light for a time corresponding to the light emission control signal with a luminance corresponding to the data signal provided through the corresponding data line in response to the scan signal provided through the corresponding scan line.

Recently, a foldable display device has been developed. To reduce power consumption, drive conditions for displaying an image only in some regions of the foldable display panel in a folded state, or for driving the display panel at different frequencies, may be achieved by partitioning the display panel into a plurality of regions.

SUMMARY

When an integrated display panel is partitioned into a plurality of regions and is driven under different conditions, a display quality is degraded in a boundary region that is affected by the different conditions.

Embodiments of the present disclosure provide a display device capable of either driving regions of a display panel under mutual drive conditions (for example, different frequencies) or driving only some regions thereof without degradation of a display quality.

To achieve one aspect of the present disclosure, a display device according to embodiments of the present disclosure includes a display that includes scan lines, data lines, light emission control lines, and pixels connected to the scan lines, to the data lines, and to the light emission control lines, a scan driver configured to sequentially provide scan signals to the scan lines, a data driver configured to provide data signals to the data lines, a light emitting driver configured to provide light emission control signals to the light emission control lines based on a light emission clock signal having pulses, and a timing controller configured to provide the light emission clock signal to the light emitting driver, to output the pulses of the light emission clock signal during a frame in a first mode, to mask at least one pulse of the pulses during a first period of the frame in a second mode, and to output at least another pulse of the pulses during a second period after the first period.

The light emitting driver may be configured to sequentially provide the light emission control signals to the light emission control lines in the first mode, and to not provide any of the light emission control signals to one of the light emission control lines corresponding to the at least one pulse in the second mode.

The first period may be less than or equal to a pulse width of each of the light emission control signals.

The second period may be greater than or equal to a cycle of the light emission clock signal.

The light emission clock signal may include a first light emission clock signal, and a second light emission clock signal obtained by delaying a phase of the first light emission clock signal by a half period, and the timing controller may be configured to partially mask the first light emission clock signal or the second light emission clock signal in the second mode.

In the second period, the first light emission clock signal may have at least one pulse, and the second light emission clock signal may have at least one pulse.

The timing controller may be configured to partially mask the other of the first light emission clock signal and the second light emission clock signal.

The frame may further include a third period after the second period, the timing controller may be configured to mask the first and second light emission clock signals during the third period in the second mode, and the third period may be larger than a pulse width of each of the light emission control signals.

The scan driver may be configured to generate the scan signals based on a scan clock signal, and the timing controller may be configured to provide the scan clock signal to the scan driver, and to mask one pulse of the scan clock signal in the second mode.

The data driver may be configured to output a data voltage corresponding to a black grayscale at a first time point at which the pulse of the scan clock signal is masked.

A second time point at which the timing controller masks the at least one pulse of the light emission clock signal may be later than a first time point at which the timing controller masks the pulse of the scan clock signal.

A difference between the first time point and the second time point may be less than or equal to a pulse width of each of the light emission control signals.

A difference between the first time point and the second time point may be greater than a pulse width of each of the light emission control signals.

The timing controller may include a region determiner to determine a first region of the display in which a still image is displayed or an image is not displayed by comparing a current frame with a previous frame, a masking time point determiner to generate a masking signal based on the first region, and a clock generator to generate the light emission clock signal, and to mask the at least one pulse of the light emission clock signal based on the masking signal.

The timing controller may further include a data compensator to generate image data by compensating input image data, the data driver may be configured to generate the data signals based on the image data, the masking time point determiner may be configured to determine a compensation period in which a pulse width of at least one of the light emission control signals is varied based on the masking signal, and the data compensator may be configured to compensate partial data of the image data corresponding to the compensation period based on the pulse width.

The timing controller may periodically switch between the first mode and the second mode.

Each of the pixels may include a light emitting element, a first transistor including a first electrode connected to a first power supply, a second electrode connected to a first node, a gate electrode connected to a second node, and a body to which a common control voltage is applied, a second transistor configured to transmit a corresponding data signal among the data signals to the second node in response to a scan signal among the scan signals, and a third transistor connecting the first node and the light emitting element.

The common control voltage may have a first voltage level is applied to the pixels in the first mode, and the common control voltage having a second voltage level that is different from the first voltage level may be applied to a part of the pixels in the second mode.

The display may include a first pixel region and a second pixel region that are separated from each other, each of first pixels among the pixels that are provided in the first pixel region may be connected to a first common control line to receive the common control voltage, and each of second pixels among the pixels that are provided in the second pixel region may be connected to a second common control line to receive the common control voltage.

The data driver may include a digital analog converter configured to generate the data signals based on gamma voltages, a common buffer configured to output one of the gamma voltages as a reference voltage, and an output buffer configured to alternately output the data signals and the reference voltage in the second mode.

Advantageous Effects

A display device according to embodiments of the present disclosure may mask a part of pulses included in a light emission clock signal in a part of one frame period, thereby masking an output of a stage corresponding to the masked light emission clock signal. In other words, thereby masking a light emission control signal. Accordingly, the display device may drive only a partial region of the display panel during one frame period.

Further, it is possible to reduce or prevent degradation of display quality by setting a time point at which a light emission clock signal is masked (or a time point at which a scan clock signal is masked) to be slower than a time point at which a black image is displayed, or by predicting affects due to masking of the light emission clock signal to compensate for data.

DETAILED DESCRIPTION

Figure 1:
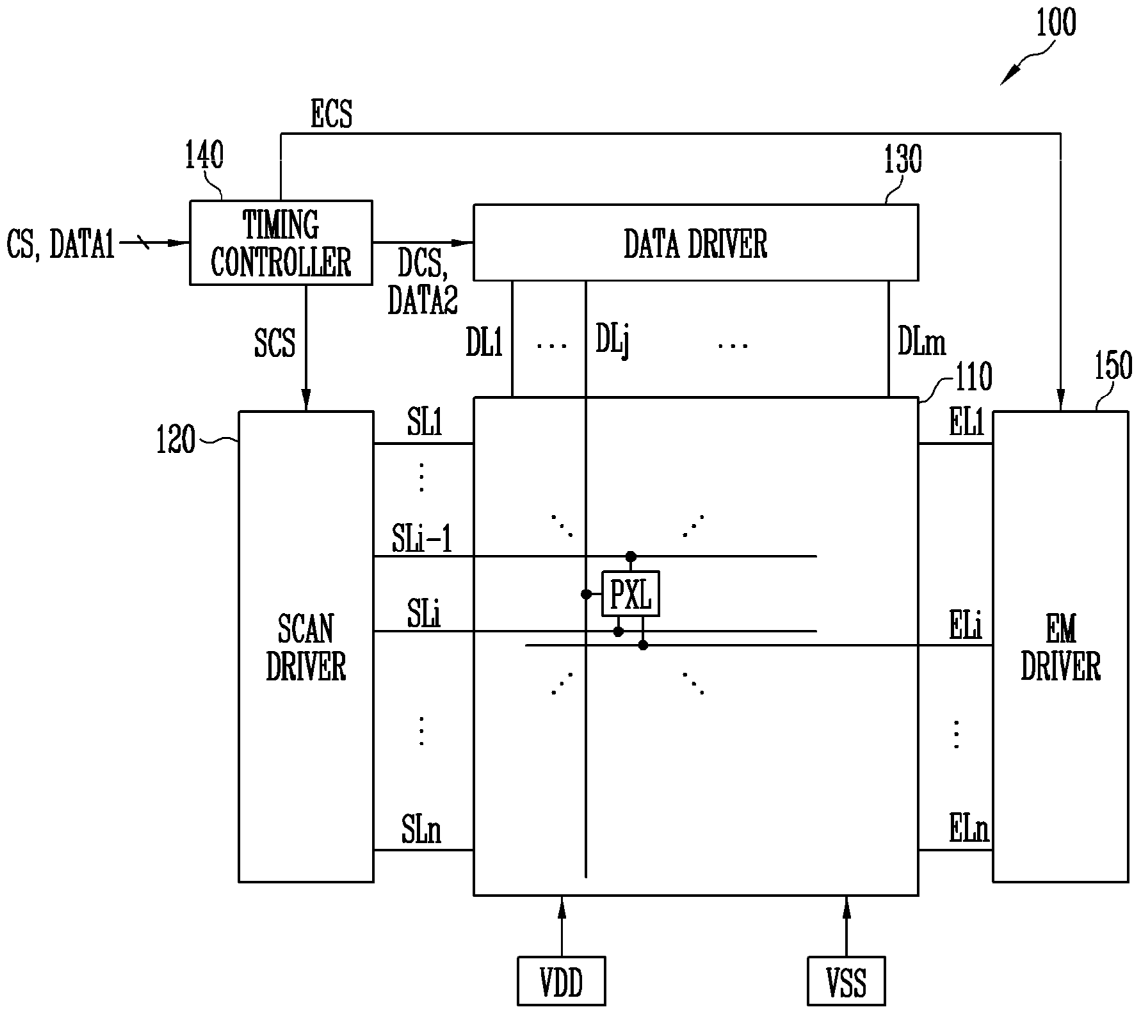
FIG. 1 is a block diagram illustrating a display device according to an embodiment of the present disclosure.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
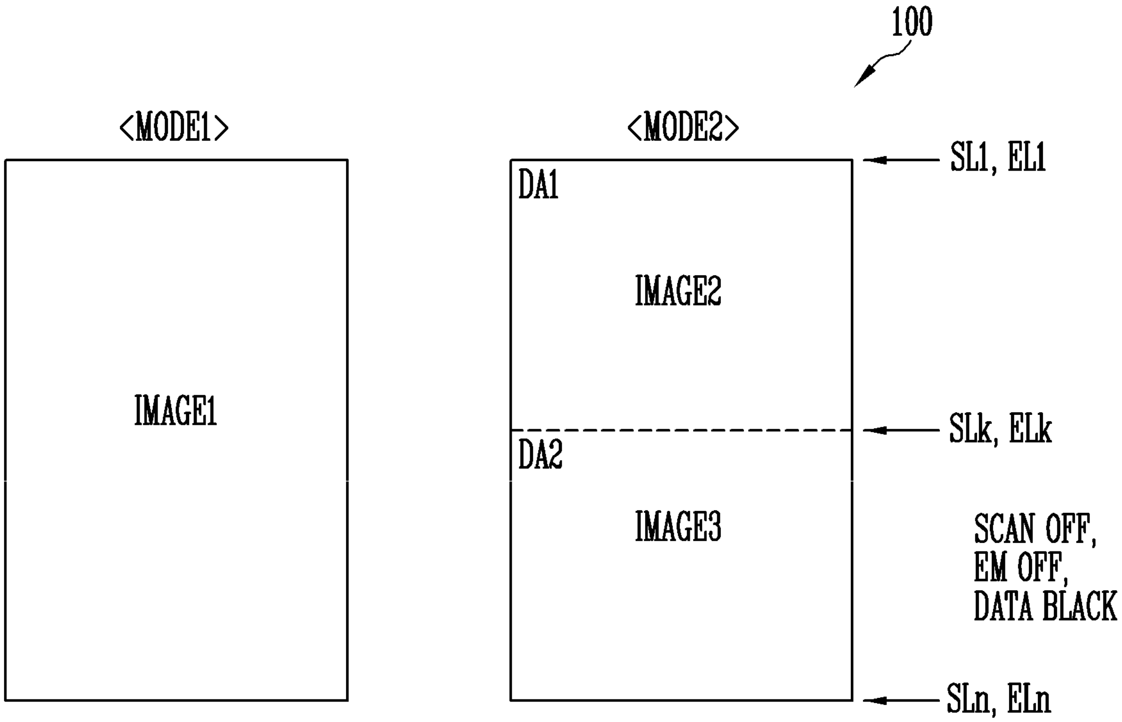
FIG. 2 is a diagram illustrating an example of drive modes of the display device of FIG. 1.

FIG. 1 is a block diagram illustrating a display device according to an embodiment of the present disclosure. FIG. 2 is a diagram illustrating an example of drive modes of the display device of FIG. 1.

First, referring to FIG. 1, a display device 100 may include a display unit/display/display panel 110, a scan driver 120 (or a gate driver), a data driver 130 (or a source driver), a timing controller 140, and a light emitting driver 150 (or an emission driver, or an EM driver).

The display 110 may include scan lines/gate lines SL1 to SLn (n is a positive integer), data lines DL1 to DLm (m is a positive integer), light emission control lines EL1 to ELn, and a pixel PX. The pixel PX may be located in a region (for example, a pixel region) partitioned by the scan lines SL1 to SLn, the data lines DL1 to DLm, and the light emission control lines EL1 to ELn.

The pixel PX may be connected to at least one of the scan lines SL1 to SLn, one of the data lines DL1 to DLm, and at least one of the light emission control lines EL1 to ELn. For example, the pixel PX may be connected to the scan line SLi, the previous scan line SLi−1 adjacent to the scan line SLi, the data line DLj, and the light emission control line ELi (each of i and j is a positive integer).

The pixel PX may be initialized in response to a scan signal provided through the previous scan line SLi−1 (or in response to a scan signal provided at a previous point in time, or in response to a previous gate signal). The pixel PX may store or record a data signal provided through the data line DLj in response to a scan signal provided through the scan line SLj (or in response to a scan signal provided at the present time point or in response to a gate signal). The pixel PX also may emit light at a luminance corresponding to the stored data signal in response to a light emission control signal provided through the light emission control line ELi.

The display 110 may be provided with first and second power supply voltages VDD and VSS. The power supply voltages VDD and VSS are voltages suitable for an operation of the pixel PX, and the first power supply voltage VDD may have a voltage level that is higher than a voltage level of the second power supply voltage VSS.

The scan driver 120 may generate the scan signal based on a scan control signal SCS, and may sequentially provide the scan signal to the scan lines SL1 to SLn. Here, the scan control signal SCS may include a scan start signal, scan clock signals, and the like, and may be provided from the timing controller 140. For example, the scan driver 120 may include a shift register (or stage) that sequentially generates and outputs the scan signals of a pulse type corresponding to the scan start signal of a pulse type by using the scan clock signals.

The light emitting driver 150 may generate the light emission control signals based on a light emission drive control signal ECS, and may sequentially provide the light emission control signals to the light emission control lines EL1 to ELn. Here, the light emission drive control signal ECS may include a light emission start signal, light emission clock signals, and the like, and may be provided from the timing controller 140. For example, the light emitting driver 150 may include a shift register that sequentially generates and outputs the light emission control signals of a pulse type corresponding to the light emission start signal of a pulse type by using the light emission clock signals.

A detailed configuration of the light emitting driver 150 will be described below with reference to FIG. 8.

The data driver 130 may generate the data signals based on image data DATA2 and a data control signal DCS that are provided from the timing controller 140, and may provide the data signals to the display 110 (or to the pixel PX). Here, the data control signal DCS is a signal for controlling an operation of the data driver 130, and may include a load signal (or a data enable signal) for indicating an output of a valid data signal.

The timing controller 140 may receive input image data DATA1 and a control signal CS from an external device (for example, from a graphic processor), may generate the scan control signal SCS and the data control signal based on the control signal CS, and may generate the image data DATA2 by converting the input image data DATA1. For example, the timing controller 140 may convert the input image data DATA1 of an RGB format into the image data DATA2 of an RGBG format to conform to a pixel arrangement in the display 110.

In some of the embodiments, the timing controller 140 may operate in a first mode and in a second mode. Here, the first mode and the second mode may be operation modes of the timing controller 140 (or the display device 100).

Referring to FIG. 2, for example, a first mode MODE1 is a normal mode, and in the first mode MODE1, the display device 100 may display a first image IMAGE1 corresponding to the entire display 110.

For example, the second mode MODE2 is a partial drive mode, and in the second mode MODE2, the display device 100 may display the second image IMAGE2 (for example, a video) in a first display region DA1 of the display 110, and may also display a third image IMAGE3 (for example, a still image or a low frequency image), or may instead not display any image, in a second display region DA2 of the display 110.

Therefore, to display the first image IMAGE1 on the entire display 110 in the first mode MODE1, the timing controller 140 may control such that each of the scan driver 120, the data driver 130, and the light emitting driver 150 operates normally.

Contrastingly, to display the second image IMAGE2 only in the first display region DA1 of the display 110, the timing controller 140 may control such that the scan driver 120, the data driver 130, and the light emitting driver 150 partially operate. For example, under a control of the timing controller 140, a scan signal SCAN may be provided only to the first scan line SL1 to the (k−1)-th scan line (k is a positive integer) corresponding to the first display region DA1, and the scan signal SCAN may not be provided to the k-th to n-th scan lines SLk to SLn (SCAN OFF). Similarly, a light emission control signal EM may be provided only to the first light emission control line EL1 to the (k−1)-th light emission control line corresponding to the first display region DA1, while the light emission control signal EM may not be provided to the k-th to n-th light emission control lines ELk to ELn (EM OFF). Further, a normal data signal DATA may be provided to the first display region DA1, and a black data signal DATA BLACK (that is, a data signal corresponding to a black grayscale value) may be provided to the second display region DA2.

Meanwhile, the first display region DA1 and the second display region DA2 may be fixed, but are not limited thereto. For example, when the display device 100 is configured as a foldable display device, the first display region DA1 and the second display region DA2 may be divided with a folding axis as a center thereof, which may be set previously.

As another example, when the display device 100 is configured as a general display device, and when the display device 100 displays an image corresponding to a document being edited (in the first display region DA1) and a virtual keyboard (in the second display region DA2), sizes (or a boundary between the first and second display regions DA1 and DA2 and a value of k) of the first and second display regions DA1 and DA2 may be varied.

In one embodiment, the timing controller 140 may mask at least one of pulses included in the scan clock signal in a part of one frame period. Here, the one frame period may be a period in which one frame image is displayed. A part of the frame period may be a time point at which the scan signal SCAN is supplied to the k-th scan line SLk, or may be a period including that time point.

For example, the scan clock signal may have a first voltage level (for example, a level of a turn-off voltage for turning off a switching element or a transistor), but may also have a pulse waveform periodically shifted to a second voltage level (for example, a level of a turn-on voltage for turning on the switching element or the transistor). The timing controller 140 may skip a transition of the scan clock signal to the second voltage level in a certain period. That is, the scan clock signal may have periodic pulses of a turn-on voltage level, and the timing controller 140 may mask, remove, or skip at least one pulse of the scan clock signal in a certain period. Therefore, the scan clock signal may have the first voltage level instead of the second voltage level in a certain period.

In this case, the scan driver 120 may sequentially output the scan signal of a pulse type having the second voltage level before a certain period of one frame period, and then, may output the scan signal having only the first voltage level in a certain period of the one frame period (also after the certain period). Therefore, only pixels in a partial region (that is, a region corresponding to a period before the partial period of the one frame period) of the display 110 may be selected to update a data signal.

In one embodiment, the timing controller 140 may mask at least one of the pulses included in the light emission clock signal in a partial period of one frame period. Here, the partial period may be a time point at which the light emission control signal EM is supplied to the kth light emission control line ELk, or may be a period including the time point, and may be the same as or different from the period in which the scan clock signal is masked. This will be described below with reference to FIG. 16.

For example, the light emission clock signal may have the second voltage level (for example, the turn-on voltage level), but may have a pulse waveform periodically shifted to the first voltage level (for example, the turn-off voltage level), and the timing controller 140 may skip a transition of the light emission clock signal to the first voltage level in a certain period. That is, the light emission clock signal may have pulses periodically having a turn-off voltage level, and the timing controller 140 may mask or remove at least one pulse of the light emission clock signal in a certain period. Accordingly, the light emission clock signal may have the second voltage level instead of the first voltage level in a certain period.

In this case, the light emitting driver 150 may sequentially output the light emission control signal of a pulse type having the first voltage level to a period before a partial period of one frame period to the light emission control lines EL1 to ELn, and then, may output the light emission control signal having only the second voltage level in the partial period of one frame period (also, after the partial period, for example, to the i-th to n-th light emission control lines ELi to ELn). As will be described below with reference to FIG. 3, while the light emission control signal having the first voltage level is supplied to the pixel PXL, the pixel PXL may update the data signal stored therein in response to the scan signal. Accordingly, only the pixels in a partial region (that is, a region corresponding to a period before the partial period of the one frame period) of the display 110 may emit light with the updated data signal.

Only a partial masking operation for the scan clock signal of the timing controller 140 may cause a scan signal (that is, the scan signal of a pulse type having the second voltage level) to be applied only to a part of the scan lines SL1 to SLn. Similarly, only a partial masking operation of the timing controller 140 for the light emission clock signal may cause the light emission control signal (that is, the light emission control signal of a pulse type having a first voltage level) to be applied only to a part of the light emission control lines EL1 to ELn.

Accordingly, the display device 100 may provide the scan signal to only a part of the scan lines SL1 to SLn without adding a separate circuit configuration or modifying the scan driver 120 and the light emitting driver 150, may provide the light emission control signal to only a part of the light emission control lines EL1 to ELn, and may partially drive the display 110, and thereby, power consumption may be reduced.

Meanwhile, at least one of the scan driver 120, the data driver 130, the timing controller 140, and the light emitting driver 150 may be formed in the display 110 or configured as an IC, and may be connected to the display 110 through a flexible circuit board. Further, at least two of the scan driver 120, the data driver 130, the timing controller 140, and the light emitting driver 150 may be configured as one IC.

Figure 3:
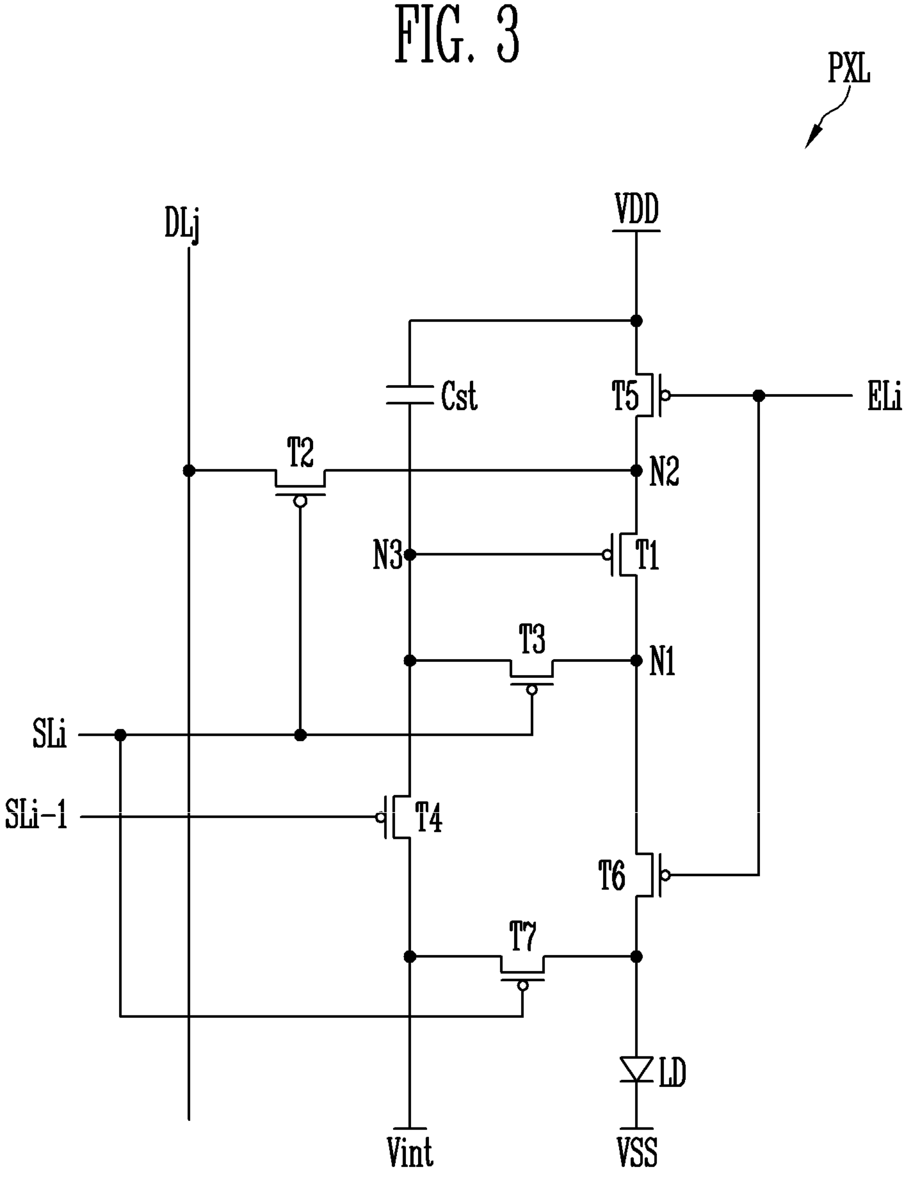
FIG. 3 is a circuit diagram illustrating an example of a pixel included in the display device of FIG. 1.

FIG. 3 is a circuit diagram illustrating an example of the pixel included in the display device of FIG. 1.

Referring to FIG. 3, the pixel PXL may include first to seventh transistors T1 to T7, a storage capacitor Cst, and a light emitting element LD.

Each of the first to seventh transistors T1 to T7 may be configured by a P-type transistor, but is not limited thereto.

For example, some or all of the first to seventh transistors T1 to T7 may be configured by an N-type transistor.

A first electrode of the first transistor T1 (drive transistor) may be connected to a second node N2, or may be connected to a first power supply line (e.g., a power supply line transmitting a first power supply voltage VDD) via the fifth transistor T5. A second electrode of the first transistor T1 may be connected to a first node N1, or may be connected to an anode of the light emitting element LD via the sixth transistor T6. A gate electrode of the first transistor T1 may be connected to a third node N3. The first transistor T1 may control the amount of currents flowing through a second power supply line (that is, a power supply line transmitting a second power supply voltage VSS) via the light emitting element LD from the first power supply line in response to a voltage of the third node N3.

The second transistor T2 may be connected between the data line DLj and the second node N2. A gate electrode of the second transistor T2 may be connected to the scan line SLi. The second transistor T2 may be turned on when the scan signal is supplied to the scan line SLi to electrically connect the first electrode of the first transistor T1 to the data line DLj.

The third transistor T3 may be connected between the first node N1 and the third node N3. A gate electrode of the third transistor T3 may be connected to the scan line SLi. The third transistor T3 may be turned on when the scan signal is supplied to the scan line SLi to electrically connect the first node N1 to the third node N3. Accordingly, when the third transistor T3 is turned on, the first transistor T1 may be connected in the form of a diode.

The storage capacitor Cst may be connected between the first power supply line and the third node N3. The storage capacitor Cst may store a voltage corresponding to the data signal and to a threshold voltage of the first transistor T1.

The fourth transistor T4 may be connected between the third node N3 and an initialization power supply line (that is, a power supply line transmitting an initialization power supply voltage Vint). A gate electrode of the fourth transistor T4 may be connected to the previous scan line SLi−1. When the scan signal is supplied to the previous scan line SLi−1, the fourth transistor T4 may be turned on to supply the initialization power supply voltage Vint to the third node N3. Here, the initialization power supply voltage Vint may be set to have a voltage level that is lower than a voltage level of the data signal.

The fifth transistor T5 may be connected between the first power supply line and the second node N2. A gate electrode of the fifth transistor T5 may be connected to the light emission control line ELi. The fifth transistor T5 may be turned off when the light emission control signal is supplied to the light emission control line ELi, and may be turned on in other cases.

The sixth transistor T6 may be connected between the first node N1 and the light emitting element LD. A gate electrode of the sixth transistor T6 may be connected to the light emission control line ELi. The sixth transistor T6 may be turned off when the light emission control signal is supplied to the light emission control line ELi, and may be turned on in other cases.

The seventh transistor T7 may be connected between the initialization power supply line and the anode of the light emitting element LD. A gate electrode of the seventh transistor T7 may be connected to the scan line SLi. The seventh transistor T7 may be turned on when the scan signal is supplied to the scan line SLi to supply the initialization power supply voltage Vint to the anode of the light emitting element LD.

The anode of the light emitting element LD may be connected to the first transistor T1 via the sixth transistor T6, and a cathode thereof may be connected to the second power supply line. The light emitting element LD may generate light (e.g., light of a predetermined luminance) in response to the current supplied from the first transistor T1. The first power supply voltage VDD may be set to have a voltage level that is higher than the second power supply voltage VSS such that a current flows through the light emitting element LD.

Figure 4:
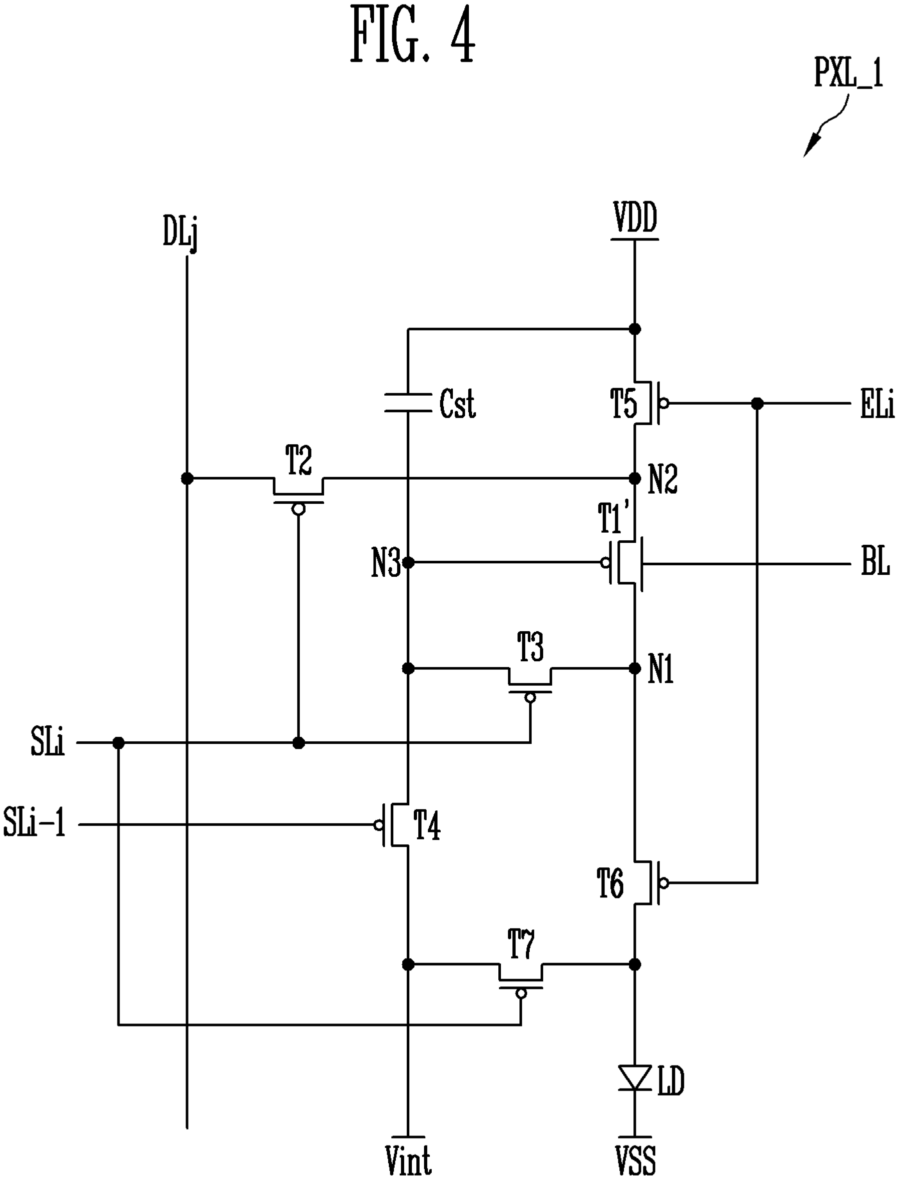
FIG. 4 is a circuit diagram illustrating another example of the pixel included in the display device of FIG. 1.

FIG. 4 is a circuit diagram illustrating another example of the pixel included in the display device of FIG. 1.

Referring to FIGS. 3 and 4, the pixel PXL_1 of FIG. 4 is different from the pixel PXL of FIG. 3 in that the pixel PXL_1 of FIG. 4 includes a first transistor T1' instead of the first transistor T1. Except for the first transistor T1', the pixel PXL_1 of FIG. 4 is substantially the same as, or similar to, the pixel PXL of FIG. 3, and thus, redundant description thereof will not be repeated.

A first electrode of the first transistor T1' may be connected to the second node N2, or may be connected to the first power supply line via the fifth transistor T5. A second electrode of the first transistor T1' may be connected to the first node N1, or may be connected to the anode of the light emitting element LD via the sixth transistor T6. A gate electrode of the first transistor T1' may be connected to the third node N3. A body (or body electrode) of the first transistor T1' may be connected to a common control line BL. Here, as will be described below with reference to FIG. 6, the common control line BL may be connected to the data driver 130 (or to the timing controller 140), and the first power supply voltage VDD (alternatively, a voltage corresponding thereto), or a gate-off voltage, may be selectively applied to the common control line BL. For example, the gate-off voltage may be a voltage with a voltage level that is higher than a voltage level of the first power supply voltage VDD.

For example, when the first power supply voltage VDD is applied to the body of the first transistor T1', the first transistor T1' may operate substantially the same as the first transistor T1 illustrated in FIG. 3. As another example, when the gate-off voltage is applied to the body of the first transistor T1', an electric field is formed in the body of the first transistor T1', and thereby, a channel of the first transistor T1' is reduced, and the first transistor T1' may be turned off despite a voltage applied to the gate electrode.

For reference, the display 110 described with reference to FIGS. 1 and 2 may be integrally configured with the first display region DA1 and the second display region DA2, and accordingly, only the second display region DA2 may not be power-off independently. A reference voltage corresponding to a black grayscale value may be applied to the second display region DA2 (or the pixel PXL_1 located in the second display region DA2) of the display 110 such that the second display region DA2 appears to be turned off. However, when the reference voltage is applied to the second display region DA2, power consumption may occur in the data driver 130. Accordingly, the display device 100 according to embodiments of the present disclosure applies the gate-off voltage to the body of the first transistor T1' located in the second display region DA2, and thereby, power consumption of the data driver 130 may be reduced while the image is not displayed in the second display region DA2.

Figure 5:
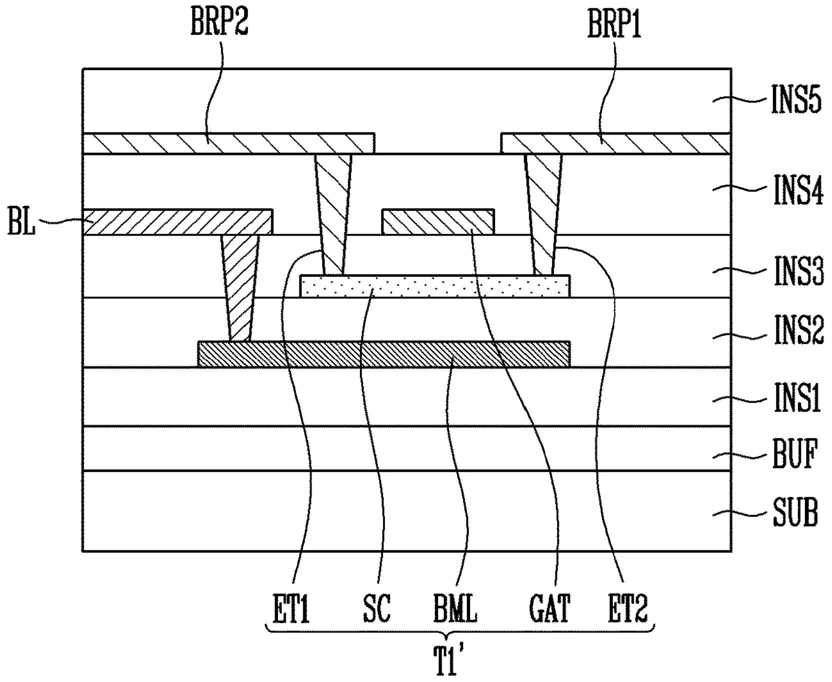
FIG. 5 is a sectional diagram illustrating an example of a first transistor included in the pixel of FIG. 4.

FIG. 5 may be referred to describe a more specific configuration of the first transistor T1'.

FIG. 5 is a sectional diagram illustrating an example of the first transistor included in a pixel of FIG. 4.

Referring to FIGS. 4 and 5, the first transistor T1' (or the pixel PXL_1 or the display 110) may include a substrate SUB, a buffer layer BUF, insulating layers INS1, INS2, INS3, INS4, and INS5, a semiconductor pattern SC, and conductive patterns GAT, BML, BRP1, and BRP2.

The substrate SUB may configure a base member of the pixel PXL_1 (or the display 110). The substrate SUB may be a rigid substrate or a flexible substrate, and a material and physical properties thereof are not limited in particular.

The buffer layer BUF may be located on the substrate SUB, and may reduce or prevent impurities from diffusing into a circuit element. The buffer layer BUF may be configured by a single layer, but may also be configured by multiple layers (e.g., at least two layers). Depending on the embodiment, the buffer layer BUF may be omitted.

The insulating layers INS1, INS2, INS3, INS4, and INS5 may be sequentially arranged on the substrate SUB (or buffer layer BUF), and may include the first insulating layer INS1 (or first gate insulating layer), the second insulating layer INS2 (or first interlayer insulating film), the third insulating layer INS3 (or second gate insulating film), the fourth insulating layer INS4 (or second interlayer insulating film), and the fifth insulating layer INS5 (or a passivation film).

Each of the insulating layers INS1, INS2, INS3, INS4, and INS5 may be configured as a single layer or as multiple layers, and may include at least one inorganic insulating material and/or organic insulating material. For example, each of the insulating layers INS1, INS2, INS3, INS4, and INS5 may include various types of organic/inorganic insulating materials currently known, including SiNx. Further, a configuration material of each of the insulating layers INS1, INS2, INS3, INS4, and INS5 is not limited in particular. Further, the insulating layers INS1, INS2, INS3, INS4, and INS5 may include insulating materials that are different from each other, or at least some of the insulating layers INS1, INS2, INS3, INS4, and INS5 may include the same insulating material as each other.

The conductive patterns GAT, BML, BRP1, and BRP2 may include a gate electrode GAT (or gate electrode pattern), a body electrode BML (or body electrode pattern), a first bridge pattern BRP1, and a second bridge pattern BRP2, and in addition to this, the conductive patterns may further include a common control line BL and the data line DLj.

Each of the gate electrode GAT, the body electrode BML, the first bridge pattern BRP1, the second bridge pattern BRP2, the common control line BL, and the data line DLj may include at least one conductive material, for example, at least one material of metals such as Ag, Mg, Al, Pt, Pd, Au, Ni, Nd, Ir, Cr, Ti, and/or an alloy thereof, and is not limited thereto.

The body electrode BML may be located on the first insulating layer INS1.

The semiconductor pattern SC may be located on the second insulating layer INS2. For example, the semiconductor pattern SC may be located between the second insulating layer INS2 and the third insulating layer INS3. The semiconductor pattern SC may include a first region in contact with a first transistor electrode ET1, a second region in contact with a second transistor electrode ET2, and a channel region located between the first and second regions. One of the first and second regions may be a source region and the other may be a drain region.

The semiconductor pattern SC may be formed of polysilicon, amorphous silicon, LTPS, or the like. The channel region of the semiconductor pattern SC may be an intrinsic semiconductor as a semiconductor pattern undoped with impurities, and the first and second regions of the semiconductor pattern SC may be semiconductor patterns doped (e.g., with predetermined impurities), respectively.

The semiconductor pattern SC may overlap the body electrode BML, and the body electrode BML may overlap at least one region of the semiconductor pattern SC.

The gate electrode GAT may be located on the third insulating layer INS3. For example, the gate electrode GAT may be located between the third insulating layer INS3 and the fourth insulating layer INS4. The gate electrode GAT may overlap at least one region of the semiconductor pattern SC.

The gate electrode GAT, the semiconductor pattern SC, the body electrode BML, and the first and second transistor electrodes ET1 and ET2 may configure the first transistor T1'.

Further, the common control line BL may be located on the third insulating layer INS3, and may be connected to the body electrode BML through a contact hole penetrating the second and third insulating layers INS2 and INS3. A disposition location of the common control line BL is not limited thereto, and for example, the common control line BL may be located on the fourth insulating layer INS4.

The first bridge pattern BRP1, the second bridge pattern BRP2, and the data line DLj may be located on the fourth insulating layer INS4.

The first bridge pattern BRP1 may be in contact with one region of the semiconductor pattern SC through the contact hole penetrating the third and fourth insulating layers INS3 and INS4, and may configure the second transistor electrode ET2 of the first transistor T1'. The first bridge pattern BRP1 may be connected to the light emitting element LD (see FIG. 3) formed on the fifth insulating layer INS5, and may configure the first node N1 described with reference to FIG. 3.

The second bridge pattern BRP2 may be in contact with one region of the semiconductor pattern SC through the contact hole penetrating the third and fourth insulating layers INS3 and INS4, and may configure the first transistor electrode ET1 of the first transistor T1'.

As described with reference to FIG. 3, the second bridge pattern BRP2 may connect the first electrode of the first transistor T1 to the second electrode of the fifth transistor T5 and to the data line DLj through the second transistor T2, and may configure the second node N2.

However, a structure of the first transistor T1' described with reference to FIG. 5 is an example, and if the first transistor T1' has a structure including a body electrode, the structure of the first transistor T1' may be modified in various forms.

Figure 6:
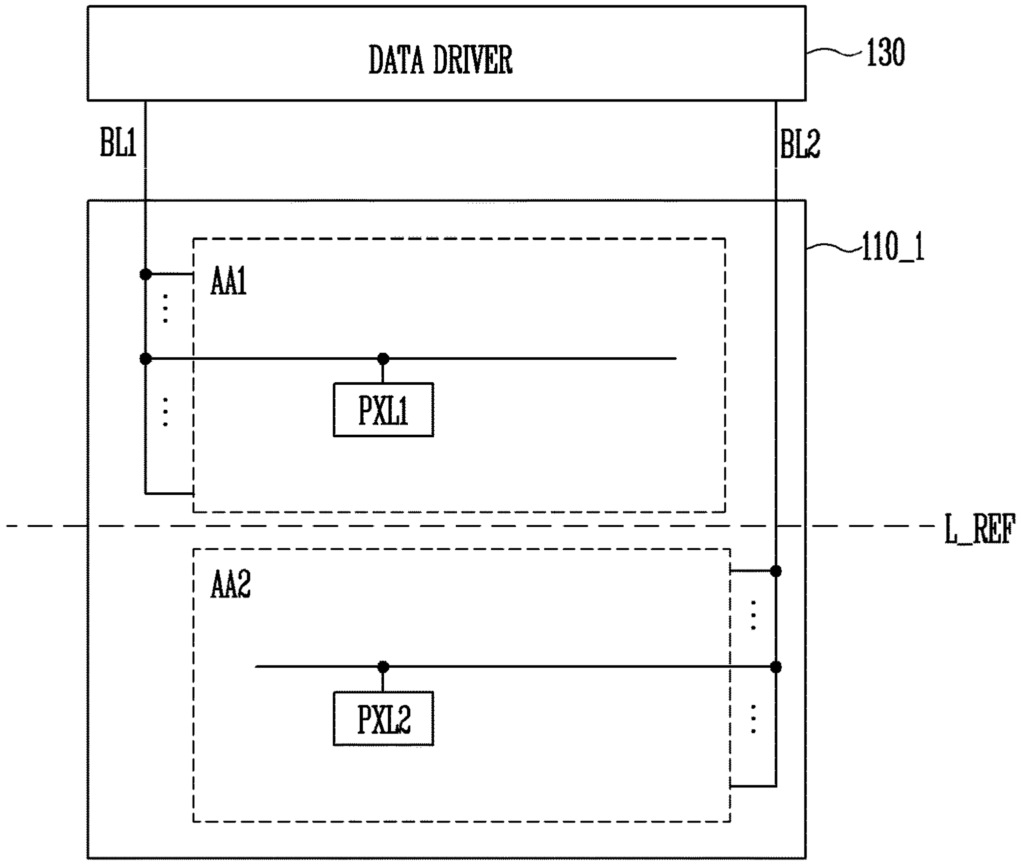
FIG. 6 is a diagram illustrating an example of a display included in the display device of FIG. 1.

FIG. 6 is a diagram illustrating an example of the display included in the display device of FIG. 1.

Referring to FIGS. 1 and 6, a display 110_1 illustrated in FIG. 6 is different from the display 110 illustrated in FIG. 1 in that the display 110_1 in FIG. 6 further includes a first common control line BL1 and a second common control line BL2. Except for the first and second common control lines BL1 and BL2, the display 110_1 is substantially the same as, or similar to, the display 110 illustrated in FIG. 1, and thus, redundant description thereof will not be repeated.

The display 110_1 may include a first active region AA1 and a second active region AA2. The first active region AA1 and the second active region AA2 are regions where the pixels PXL1 and PXL2 are provided, and may correspond to the first display region DA1 and the second display region DA2 described with reference to FIG. 2, respectively. The first pixel PXL1 may be provided in the first active region AA1, and the second pixel PXL2 may be provided in the second active region PXL2.

The first active region AA1 and the second active region AA2 may be distinguished from each other with a reference line L_REF as a center and may have substantially the same area as each other. For example, when the display 110_1 is configured as a foldable display panel, the first active region AA1 and the second active region AA2 may be distinguished from each other with a folding axis as a center.

The first common control line BL1 may be located in the first active region AA1 and connected to the first pixel PXL1. All pixels located in the first active region AA1 may be commonly connected to the first common control line BL1. As described above, the first power supply voltage VDD or a gate-off voltage may be selectively applied to the first common control line BL1 from the data driver 130.

Similarly, the second common control line BL2 may be located in the second active region AA2 and connected to the second pixel PXL2. All pixels located in the second active region AA2 may be commonly connected to the second common control line BL2.

Figure 7:
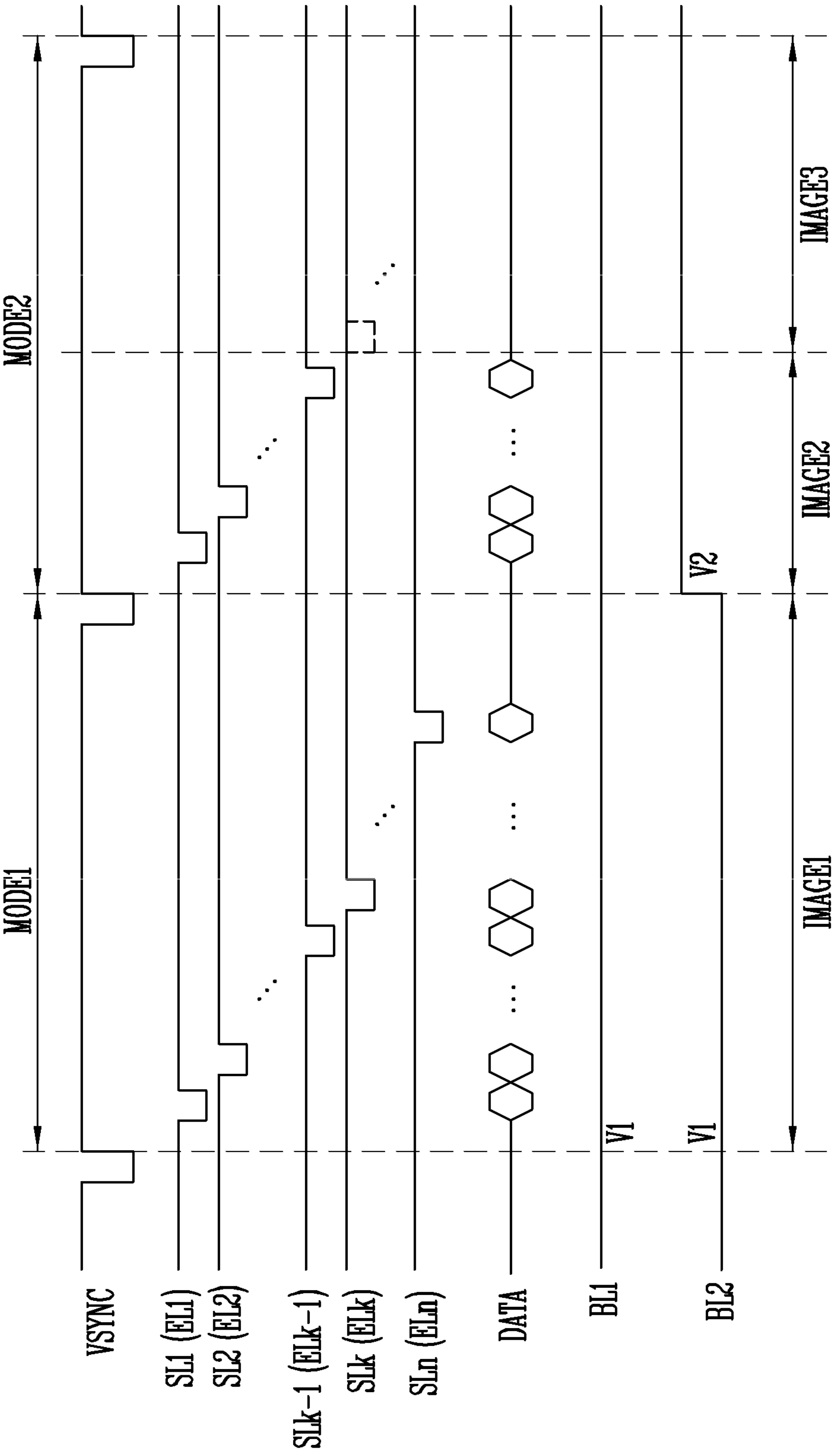
FIG. 7 is a waveform diagram illustrating an operation of the display of FIG. 6.

FIG. 7 may be used for reference to describe a control of the display 110_1 through the common control lines BL1 and BL2.

FIG. 7 is a waveform diagram illustrating an operation of the display of FIG. 6.

FIG. 7 illustrates a vertical synchronization signal VSYNC, the scan signal applied to the first to nth scan lines SL1 to SLn (or the light emission control signal applied to the first to nth light emission control lines EL1 to ELn), the data signal DATA, and common control voltages applied to the first and second common control lines BL1 and BL2.

The vertical synchronization signal VSYNC may be included in the control signal CS (see FIG. 1), and may define a start of a frame period.

When the display device 100 operates in the first mode MODE1, the scan signals of a low level pulse may be sequentially applied to the first to nth scan lines SL1 to SLn, and the data signal DATA having a valid value (for example, a voltage level corresponding to various grayscale values other than a black grayscale value) may be applied to the data lines. As the display 110_1 (or the first and second active regions AA1 and AA2) normally displays the first image IMAGE1, the common control voltage of a first power supply voltage level V1 (for example, the first power supply voltage VDD) may be applied to the first and second common control lines BL1 and BL2.

When the display device 100 operates in the second mode MODE2, the scan signals of a low level pulse may be sequentially applied to the first to (k−1)-th scan lines SL1 to SLk−1 (that is, applied to only the first active region AA1), the data signal DATA having a valid value may be applied to the data lines corresponding to the first to (k−1)-th scan lines SL1 to SLk−1, and the data signal DATA having a reference voltage (that is, a voltage level corresponding to the black grayscale value) may be applied to the data lines corresponding to the k-th to n-th scan lines SLk to SLn. Because only the first active region AA1 displays the second image IMAGE2 while the second active region AA2 displays the third image IMAGE3 (for example, a black image), a common control voltage of the first voltage level V1 may be applied to the first common control line BL1, and a common control voltage of the second voltage level V2 (for example, the gate-off voltage) may be applied to the second common control line BL2.

The display 110_1 may be configured as a foldable display panel, and when the display 110_1 is folded (e.g., in the second mode MODE2), an image may be displayed only in one region of the display 110_1 (for example, in the first active region AA1) in a fixed manner. In this case, the display 110_1 of FIG. 6 may be applied to the display device 100, and power consumption of the display device 100 (or the data driver 130) may be reduced.

Meanwhile, FIG. 6 illustrates that the display 110_1 includes two active regions AA1 and AA2 and two common control lines BL1 and BL2, but the present disclosure is not limited thereto. For example, the display 110 may include three or more active regions and three or more common control lines respectively corresponding thereto.

Figure 8:
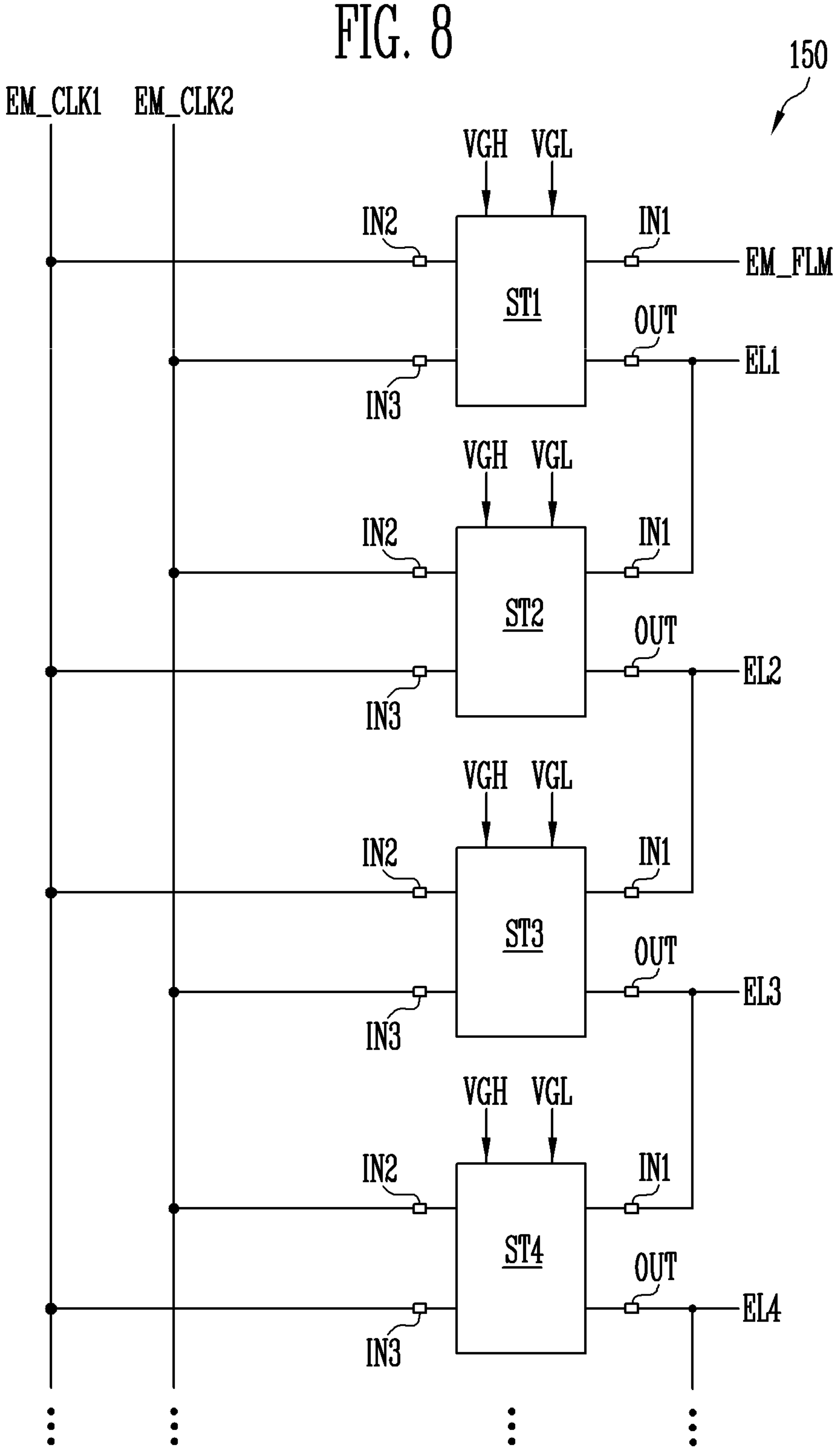
FIG. 8 is a block diagram illustrating an example of a light emitting driver included in the display device of FIG. 1.

FIG. 8 is a block diagram illustrating an example of the light emitting driver included in the display device of FIG. 1.

Referring to FIG. 8, the light emitting driver 150 may include stages ST1 to ST4 (or light emission stages). The stages ST1 to ST4 may be connected to the corresponding emission control lines EL1 to EL4, respectively, and may be commonly connected to the light emission clock signal lines (that is, signal lines transmitting light emission clock signals EM_CLK1 and EM_CLK2). The stages ST1 to ST4 may have substantially the same circuit structure as each other.

Each of the stages ST1 to ST4 may include a first input terminal IN1, a second input terminal IN2, a third input terminal IN3, and an output terminal OUT.

The first input terminal IN1 may receive a carry signal. Here, the carry signal may include a light emission start signal EM_FLM (or light emission start pulse) or an output signal (that is, a light emission control signal) of a previous stage (or a preceding stage). For example, a first input terminal IN1 of the first stage ST1 may receive the light emission start signal EM_FLM, while the first input terminal IN1 of each of the remaining stages ST2 to ST4 may receive the output signal/light emission control signal of the previous stage. That is, the light emission control signal of the previous stage of the corresponding stage (e.g., the immediately preceding stage) may be provided to the corresponding stage as the carry signal.

A second input terminal IN2 of the first stage ST1 may be connected to the first light emission clock signal line to receive the first light emission clock signal EM_CLK1, and a third input terminal IN3 of the first stage ST1 may be connected to the second light emission clock signal line to receive the second light emission clock signal EM_CLK2.

A second input terminal IN2 of the second stage ST2 may be connected to the second light emission clock signal line to receive the second light emission clock signal EM_CLK2, and a third input terminal IN3 of the second stage ST2 may be connected to the first light emission clock signal line to receive the first light emission clock signal EM_CLK1.

Similar to the first stage ST1, a second input terminal IN2 of the third stage ST3 may be connected to the first light emission clock signal line to receive the first light emission clock signal EM_CLK1, and a third input terminal IN3 of the third stage ST3 may be connected to the second light emission clock signal line to receive the second light emission clock signal EM_CLK2.

Similar to the second stage ST2, a second input terminal IN2 of the fourth stage ST4 may be connected to the second light emission clock signal line to receive the second light emission clock signal EM_CLK2, and a third input terminal IN3 of the fourth stage ST4 may be connected to the first light emission clock signal line to receive the first light emission clock signal EM_CLK1.

That is, the first light emission clock signal line and the second light emission clock signal line may be alternately respectively connected to the second input terminal IN2 and the third input terminal IN3 of each stage, or the first light emission clock signal EM_CLK1 and the second light emission clock signal EM_CLK2 may be alternately respectively provided to the second input terminal IN2 and the third input terminal IN3 of each stage.

As will be described below, pulses of the first light emission clock signal EM_CLK1 provided through the first light emission clock signal line, and pulses of the second light emission clock signal EM_CLK2 provided through the second light emission clock signal line, may not temporally overlap each other. At this time, each of the pulses may have a turn-on voltage level.

The stages ST1 to ST4 may receive a first voltage VGH (or high voltage level) and a second voltage VGL (or low voltage level). The first voltage VGH may be set to a turn-off voltage level, and the second voltage VGL may be set to a turn-on voltage level.

Figure 9:
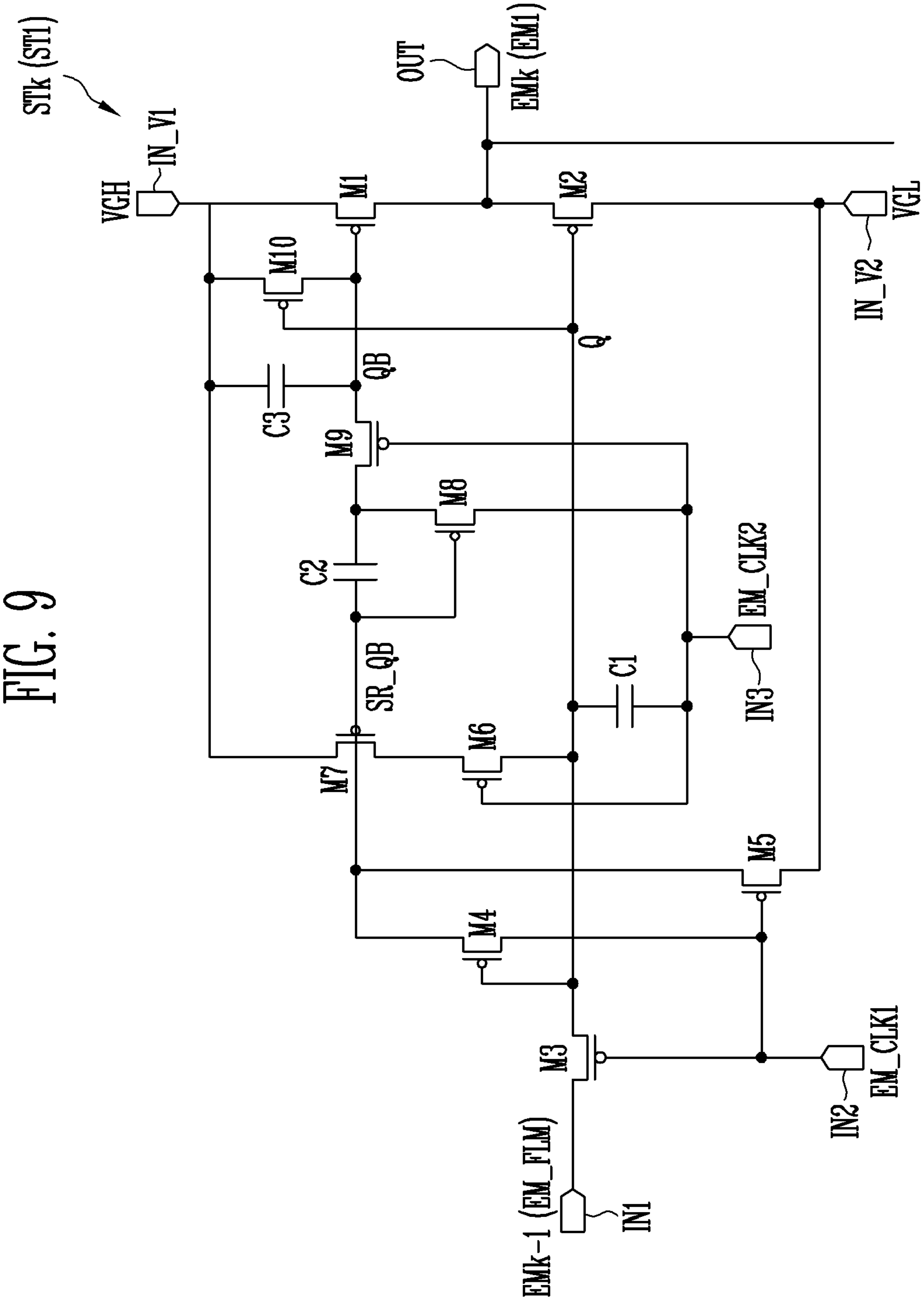
FIG. 9 is a circuit diagram illustrating an example of a stage included in the light emitting driver of FIG. 8.

FIG. 9 is a circuit diagram illustrating an example of the stage included in the light emitting driver of FIG. 8. Because the stages ST1 to ST4 illustrated in FIG. 8 are substantially the same as each other except for a configuration for receiving the light emission clock signals EM_CLK1 and EM_CLK2, hereinafter, a k-th stage STk (e.g., the first stage ST1) will be described on behalf of the stages ST1 to ST4.

Referring to FIGS. 8 and 9, the k-th stage STk may include first to tenth switching elements M1 to M10 (or transistors) and first to third capacitors C1 to C3.

The first switching element M1 may include a first electrode (e.g., a first electrode connected to a first power supply input terminal IN_V1 to which the first voltage VGH is applied), a second electrode connected to an output terminal, and a gate electrode connected to a second control node QB (or QB node).

The second switching element M2 may include a first electrode connected to the output terminal OUT, a second electrode connected to a second power supply input terminal IN_V2 to which the second voltage VGL is applied, and a gate electrode connected to a first control node Q (or Q node).

The first switching element M1 and the second switching element M2 may configure an output stage, and may output the first voltage VGH or the second voltage VGL as the kth light emission control signal EMk (e.g., as the first light emission control signal EM1) in response to a node voltage of the first control node Q and a node voltage of the second control node QB.

The third switching element M3 may include a first electrode connected to the first input terminal IN1, a second electrode connected to the first control node Q, and a gate electrode connected to the second input terminal IN2.

The fourth switching element M4 may include a first electrode connected to a third control node SR_QB (or SR_QB node), a second electrode connected to the second input terminal IN2, and a gate electrode connected to the first control node Q. As will be described below, the third control node SR_QB may be connected to the second control node QB through the second capacitor C2 and the ninth switching element M9.

The fifth switching element M5 may include a first electrode connected to the third control node SR_QB, a second electrode connected to the second power supply input terminal IN_V2, and a gate electrode connected to the second input terminal IN2.

The third to fifth switching elements M3 to M5 configure an input stage, and may control a node voltage of the first control node Q and a node voltage of the third control node SR_QB in response to a (k−1)-th light emission control signal EMk−1 (e.g., in response to the light emission start signal EM_FLM) applied to the first input terminal IN1, and in response to the first light emission clock signal EM_CLK1 applied to the second input terminal IN2.

The sixth switching element M6 and the seventh switching element M7 may be connected in series between the first power supply input terminal IN_V1 and the first control node Q.

The sixth switching element M6 may include a first electrode connected to a second electrode of the seventh switching element M7, a second electrode connected to the first control node Q, and a gate electrode connected to the third input terminal IN3.

The seventh switching element M7 may include a first electrode connected to the first power supply input terminal IN_V1, the second electrode connected to the first electrode of the sixth switching element M6, and a gate electrode connected to the third control node SR_QB.

The first capacitor C1 may be connected between the first control node Q and a first electrode of the ninth switching element M9.

The sixth and seventh switching elements M6 and M7 and the first capacitor C1 may maintain the node voltage of the first control node Q based on the second light emission clock signal EM_CLK2 applied to the third input terminal IN3 and based on the third control node SR_QB.

The second capacitor C2 may be connected between the second control node QB and the third control node SR_QB.

The eighth switching element M8 may include a first electrode connected to the first electrode of the ninth switching element M9, a second electrode connected to the third input terminal IN3, and a gate electrode connected to the third control node SR_QB.

The ninth switching element M9 may include the first electrode connected to the second capacitor C2 and to the first electrode of the eighth switching element M8, a second electrode connected to the second control node QB, and a gate electrode connected to the third input terminal IN3.

The third capacitor C3 may be connected between the first power supply input terminal IN_V1 and the second control node QB.

The tenth switching element M10 may include a first electrode connected to the first power supply input terminal IN_V1, a second electrode connected to the second control node QB, and a gate electrode connected to the first control node Q.

The eighth to tenth switching elements M8 to M10 and the third capacitor C3 may control the node voltage of the second control node QB based on the node voltage of the third control node SR_QB, the second light emission clock signal EM_CLK2 applied to the third input terminal IN3, and the node voltage of the first control node Q.

Meanwhile, FIG. 9 illustrates that the first to tenth switching elements M1 to M10 are configured by P-type transistors, but the present embodiment is an example and is not limited thereto. For example, the first to tenth switching elements M1 to M10 may be configured by N-type transistors.

Figure 10:
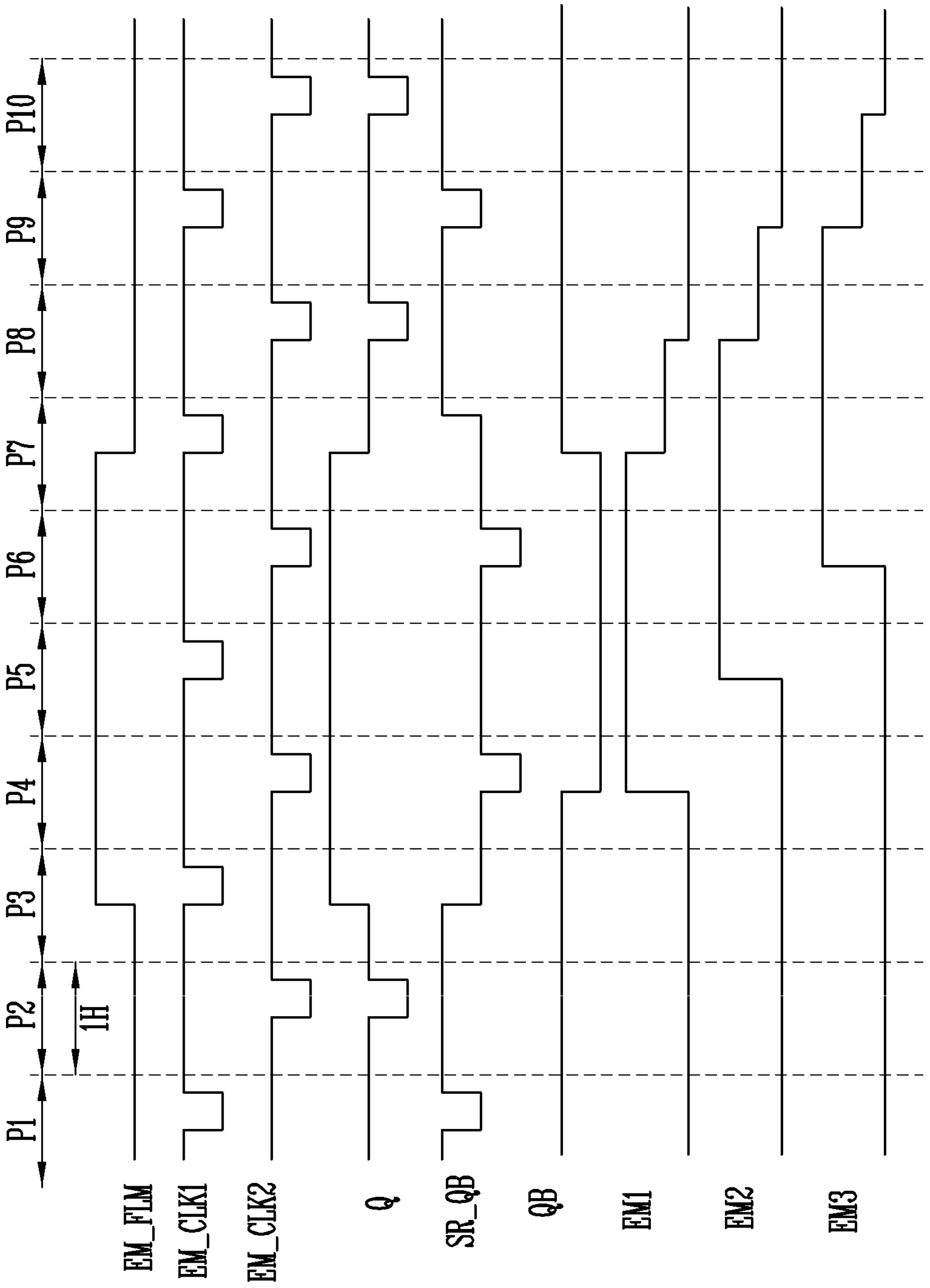
FIG. 10 is a waveform diagram illustrating an example of signals measured in the stage of FIG. 9 operating in a first mode.

FIG. 10 is a waveform diagram illustrating an example of signals measured at the stage of FIG. 9 operating in a first mode. In FIG. 10, a width of each of first to tenth periods P1 to P10 may be one horizontal time period 1H.

FIGS. 9 and 10 illustrate the light emission start signal EM_FLM, the first and second light emission clock signals EM_CLK1 and EM_CLK2, the node voltages of the first to third control nodes Q, QB, and SR_QB of the first stage ST1, and the first to third light emission control signals EM1 to EM3. Hereinafter, for the sake of convenient description, a turn-off voltage level equal to a voltage level of the first voltage VGH is referred to as a high level, and a turn-on voltage level equal to a voltage level of the second voltage VGL is referred to as a low level.

In the first period P1, the light emission start signal EM_FLM may have a low level, and the first light emission clock signal EM_CLK1 may have a low level pulse.

In this case, in the first stage ST1, the third switching element M3 may be turned on, the light emission control signal EM_FLM may be applied to the first control node Q, and the node voltage of the first control node Q may have a low level. Accordingly, the second switching element M2 may be turned on and the first light emission control signal EM1 may have a low level.

Meanwhile, the fourth switching element M4 and the fifth switching element M5 may be turned on, the second voltage VGL may be applied to the third control node SR_QB, and the third control node SR_QB may have a low level. The tenth switching element M10 may be turned on in response to the node voltage of the first control node Q, and the second control node QB may have a high level.

In the second period P2, the second light emission clock signal EM_CLK2 may have a low level pulse. In this case, the node voltage of the first control node Q may have a voltage level that is lower than the low level due to the first capacitor C1. According to the node voltage of the first control node Q, the second switching element M2 may maintain a turn-on state, and the first light emission control signal EM1 (e.g., the output signal EMk) may have a low level.

In the third period P3, the light emission start signal EM_FLM may be shifted to a high level, and the first light emission clock signal EM_CLK1 may have a low level pulse.

In this case, the third switching element M3 may be turned on, the light emission start signal EM_FLM of a high level may be applied to the first control node Q, and the node voltage of the first control node Q may have a high level.

Meanwhile, the fifth switching element M5 may be turned on, the second voltage VGL may be applied to the third control node SR_QB, and the third control node SR_QB may have a low level. The eighth switching element M8 may be turned on in response to the node voltage of the third control node SR_QB, and a voltage difference between the high level and the low level may be stored in the second capacitor C2.

Meanwhile, because the ninth switching element M9 is in a turn-off state, the node voltage of the second control node QB may have a high level, and the first switching element M1 may maintain the turn-off state. Accordingly, the first light emission control signal EM1 may have a low level as in the second period P2.

In the fourth period P4, the second light emission clock signal EM_CLK2 may have a low level pulse. In this case, the ninth switching element M9 may be turned on, the second light emission clock signal EM_CLK2 may be applied to the second control node QB through the eighth switching element M8 and the ninth switching element M9, and the second control node QB may have a low level. Meanwhile, the third control node SR_QB may be boosted to be lower than the low level by the second capacitor C2.

The first switching element M1 may be turned on in response to the node voltage of the second control node QB, and the first light emission control signal EM1 may have a high level.

In the fifth period P5, the first light emission clock signal EM_CLK1 may have a low level pulse. However, because the light emission start signal EM_FLM has a high level, the node voltage of the first control node Q may be maintained at a high level.

The node voltage of the second control node QB may be maintained at a low level by the third capacitor C3, and a voltage level of the first light emission control signal EM1 may be maintained at a high level by the first switching element M1, which is turned on.

An operation of the first stage ST1 in the sixth period P6 is substantially the same as the operation of the first stage ST1 in the fourth period P4, and thereby, the voltage level of the first emission control signal EM1 may be maintained at a high level.

In the seventh period P7, the light emission start signal EM_FLM may be shifted to a low level, and the first light emission clock signal EM_CLK1 may have a low level pulse.

In this case, the third switching element M3 may be turned on, the light emission start signal EM_FLM of a low level may be applied to the first control node Q, and the node voltage of the first control node Q may be at a low level. Accordingly, the second switching element M2 may be turned on and the voltage level of the first light emission control signal EM1 may be shifted to a low level.

The second control node QB may be shifted to a high level by the tenth switching element M10 which is turned on. The first light emission clock signal EM_CLK1 may be applied to the third control node SR_QB by the fourth and fifth switching elements M4 and M5 which are turned on, and the third control node SR_QB may have a low level in response to a pulse of the first light emission clock signal EM_CLK1 and then may be shifted to a high level.

In the eighth period P8, the second light emission clock signal EM_CLK2 may have a low level pulse. In this case, the node voltage of the first control node Q may be boosted to a voltage level that is lower than the low level by the first capacitor C1, and the first light emission control signal EM1 may have a low level.

An operation of the first stage ST1 in the ninth period P9 may be substantially the same as the operation of the first stage ST1 in the first period P1, and an operation of the first stage ST1 in the tenth period P10 may be substantially the same as the operation of the first stage ST1 in the second period P2. Accordingly, redundant description thereof will not be repeated.

As described with reference to FIG. 10, the first stage ST1 may shift the light emission start signal EM_FLM by one horizontal time period 1H based on the first and second light emission clock signals EM_CLK1 and EM_CLK2, and may output the first light emission control signal EM1.

Meanwhile, similar to the first stage ST1, the second stage ST2 (see FIG. 8) may shift the first light emission control signal EM1, and may output the second light emission control signal EM2 of a high level in the fifth to eighth periods P5 to P8. The third stage ST3 (see FIG. 8) may shift the second light emission control signal EM2, and may output the third light emission control signal EM3 of a high level in the sixth to ninth periods P6 to P9.

Figure 11:
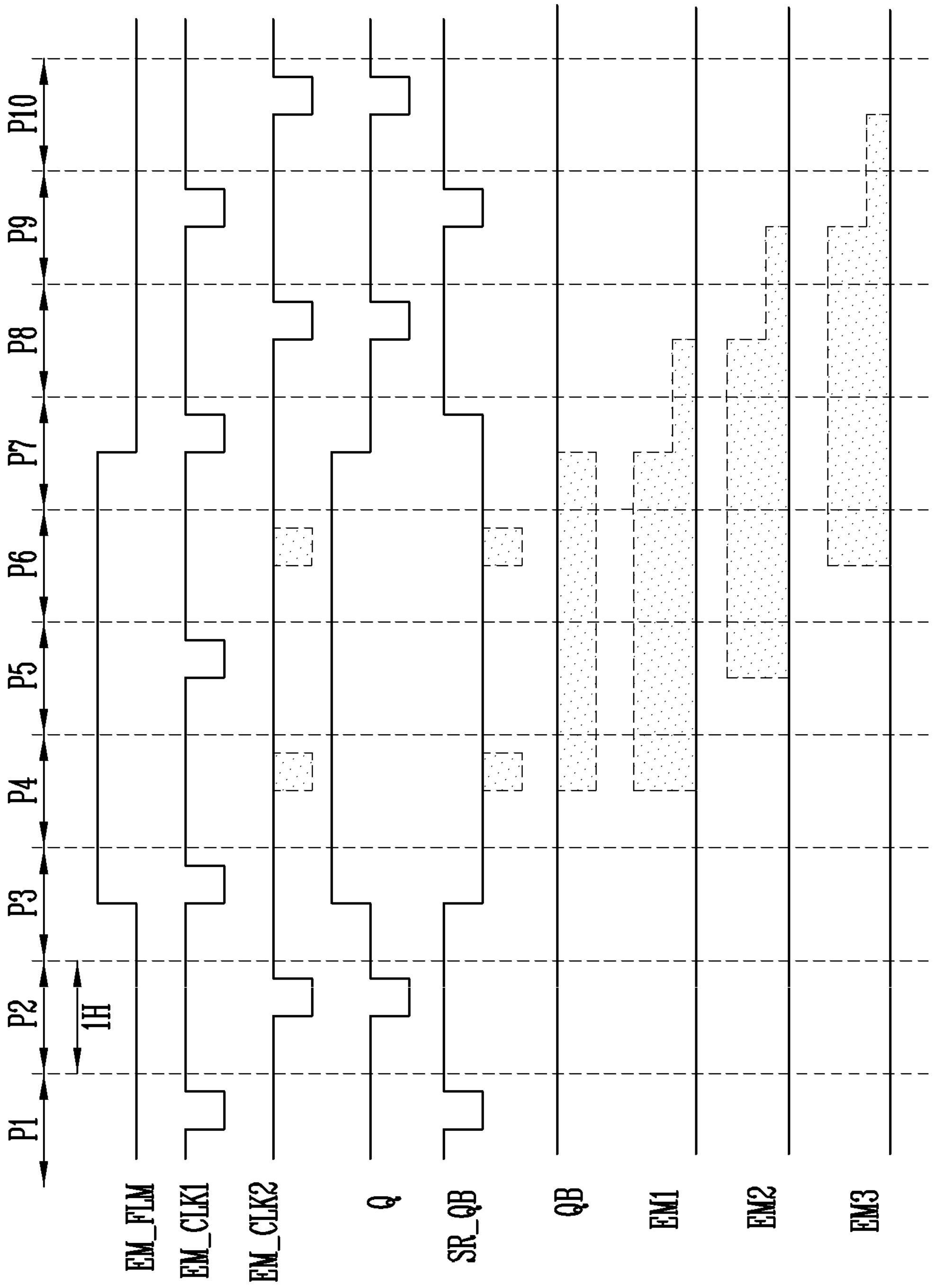
FIG. 11 is a waveform diagram illustrating an example of the signals measured in the stage of FIG. 9 operating in a second mode.

FIG. 11 is a waveform diagram illustrating an example of the signals measured at the stages of FIG. 9 operating in the second mode. FIG. 11 is a waveform diagram of signals corresponding to the signals of FIG. 10.

Referring to FIGS. 9 to 11, at least one of the pulses included in the second light emission clock signal EM_CLK2 may be masked in the second mode.

An operation of the first stage ST1 in the first to third periods P1 to P3 may be substantially the same as the operation of the first stage ST1 in the first to third periods P1 to P3 described with reference to FIG. 10, and thus, redundant description thereof will not be repeated.

In the fourth period P4, a pulse of a low level pulse of the second light emission clock signal EM_CLK2 is masked, and thereby, the second light emission clock signal EM_CLK2 may have a high level. Further, the first light emission clock signal EM_CLK1 may have a high level.

Accordingly, the first stage ST1 may maintain the same state as in the third period P3, the node voltage of the second control node QB may have a high level, and the first light emission control signal EM1 may be maintained to a low level.

In the fifth period P5, the first light emission clock signal EM_CLK1 may have a low level pulse. However, the light emission start signal EM_FLM has a high level, and thereby, a node voltage of the first control node Q may be maintained at a high level.

A node voltage of the second control node QB may be maintained at a high level by the third capacitor C3, and the first switching element M1 may maintain a turn-off state. Accordingly, the first light emission control signal EM1 may have a low level as in the fourth period P4.

An operation of the first stage ST1 in the sixth period P6 is substantially the same as the operation of the first stage ST1 in the fourth period P4, and thereby, the voltage level of the first light emission control signal EM1 may be maintained at a low level.

In the seventh period P7, the light emission start signal EM_FLM may be shifted to a low level, and the first light emission clock signal EM_CLK1 may have a low level pulse.

In this case, the third switching element M3 may be turned on, the light emission start signal EM_FLM of a low level may be applied to the first control node Q, and the node voltage of the first control node Q may have a low level. Accordingly, the second switching element M2 may be turned on and the voltage level of the first light emission control signal EM1 may be maintained at a low level.

The second control node QB may remain at a high level by the tenth switching element M10 which is turned on. The first light emission clock signal EM_CLK1 may be applied to the third control node SR_QB by the fourth and fifth switching elements M4 and M5, which are turned on. The third control node SR_QB may have a low level in response to a pulse of the first light emission clock signal EM_CLK1, and then, may be shifted to a high level.

That is, in the seventh period P7, the node voltage of the first control node Q may be initialized or reset to a low level by the pulse of the first light emission clock signal EM_CLK1 (that is, by the pulse of the first light emission clock signal EM_CLK1 applied immediately after the second light emission clock signal EM_CLK2 is masked), and the node voltage of the third control node SR_QB may be initialized or reset to a high level.

An operation of the first stage ST1 in the eighth to tenth periods P8 to P10 is substantially the same as the operation of the first stage ST1 in the eighth to tenth periods P8 to P10 described with reference to FIG. 10, and thus, redundant description thereof will not be repeated.

As described with reference to FIG. 11, in the second mode, a pulse of the second light emission clock signal is masked during a period (for example, the fourth to sixth periods P4 to P6) corresponding to the pulse of the light emission start signal EM_FLM, and thereby, the first stage ST1 may output only the first light emission control signal EM1 of a low level.

As the first light emission control signal EM1 is shifted to be output, the second stage ST2 (see FIG. 8) may output only the second light emission control signal EM2 of a low level, and similarly, the third stage ST3 (see FIG. 8) may output only the third light emission control signal EM3 of a low level.

Meanwhile, FIG. 11 illustrates that only the second light emission clock signal EM_CLK2 is masked in the fourth to sixth periods P4 to P6, but the present disclosure is not limited thereto.

Figure 12:
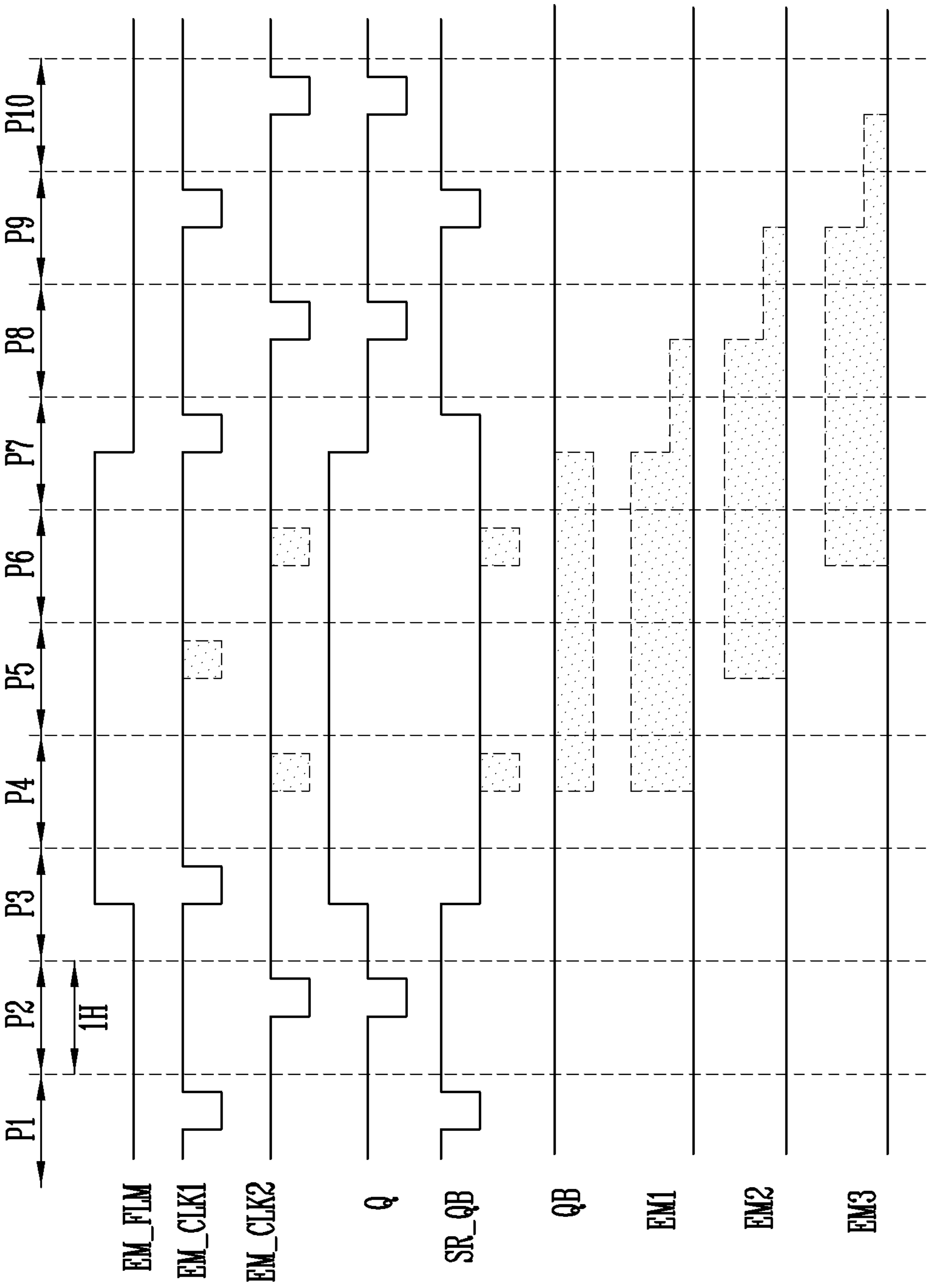
FIG. 12 is a waveform diagram illustrating another example of the signals measured in the stage of FIG. 9 operating in the second mode.

FIG. 12 is a waveform diagram illustrating another example of the signals measured in the stage of FIG. 9 operating in the second mode. FIG. 12 is a waveform diagram of signals corresponding to the signals of FIG. 11.

Referring to FIGS. 11 and 12, while at least one of the pulses included in the second light emission clock signal EM_CLK2 is masked in the second mode, at least one of the pulses included in the first light emission clock signal EM_CLK1 may also be masked.

An operation of the first stage ST1 in the first to fourth periods P1 to P4 and the sixth to tenth periods P6 to P10 is substantially the same as the operation of the first stage ST1 in the first to fourth periods P1 to P4 and the sixth to tenth periods P6 to P10 described with reference to FIG. 11, and thus, redundant description thereof will not be repeated.

In the fifth period P5, a low level pulse of the first light emission clock signal EM_CLK1 is masked, and thereby, the first light emission clock signal EM_CLK1 may have a high level.

Accordingly, the first stage ST1 maintains the same state as the fourth period P4, the node voltage of the second control node QB may have a high level, and the first light emission control signal EM1 may be maintained at a low level.

That is, when all of the first and second light emission clock signals EM_CLK1 and EM_CLK2 are masked in the fourth to sixth periods P4 to P6, the first light emission control signal corresponding to the fourth period P4 and subsequent light emission control signals (for example, the second light emission control signal EM2, the third light emission control signal EM3, and the like) may have only a low level.

Figure 13:
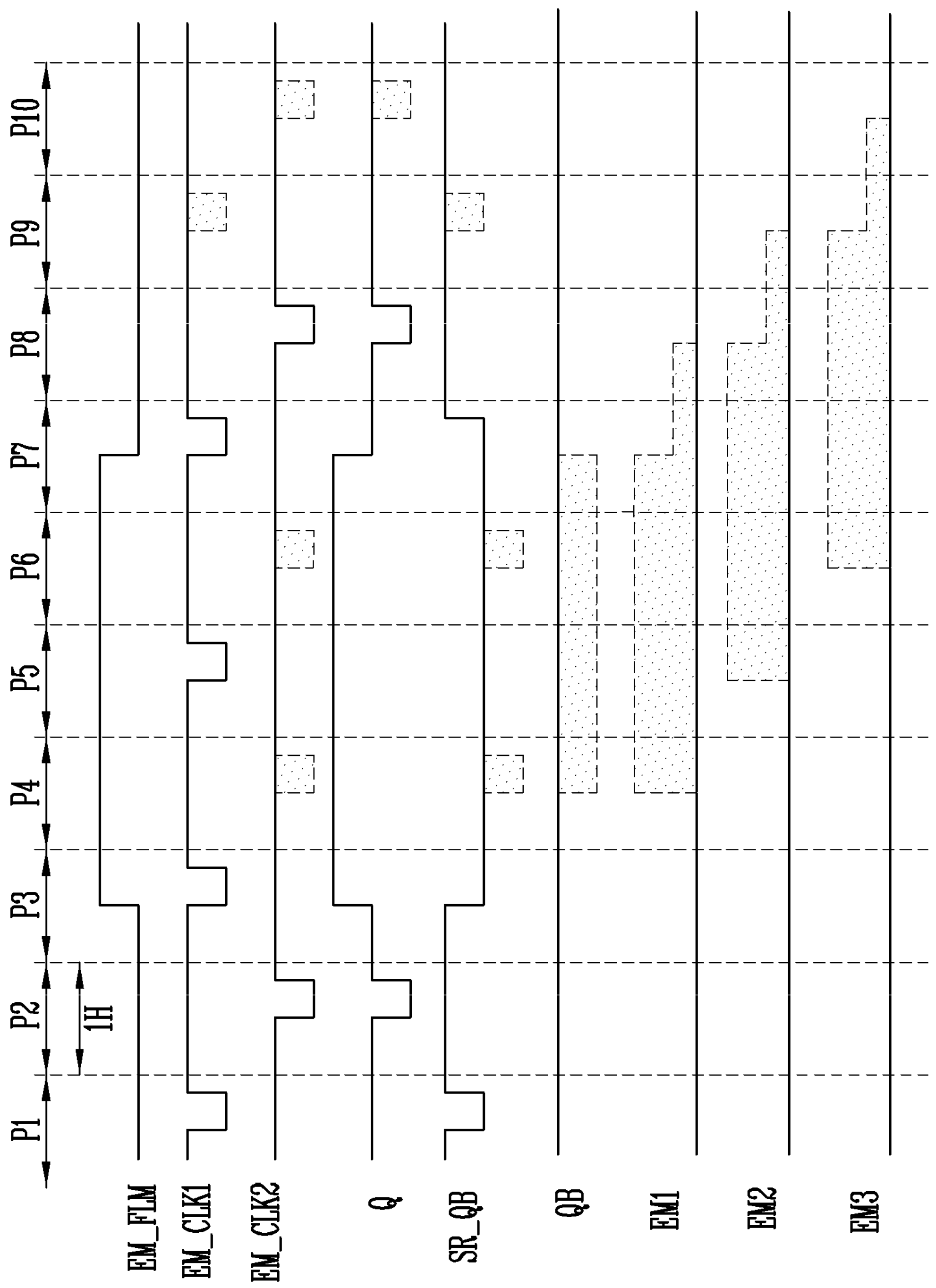
FIG. 13 is a waveform diagram illustrating still another example of the signals measured in the stage of FIG. 9 operating in the second mode.

FIG. 13 is a waveform diagram illustrating still another example of the signals measured in the stage of FIG. 9 operating in the second mode. FIG. 13 is a waveform diagram of signals corresponding to the signals of FIG. 11.

Referring to FIGS. 11 and 13, after at least one of the pulses included in the second light emission clock signal EM_CLK2 is masked in the second mode, the first and second light emission clock signals EM_CLK1 and EM_CLK2 may all be masked.

An operation of the first stage ST1 in the first to eighth periods P1 to P8 is substantially the same as the operation of the first stage ST1 in the first to eighth periods P1 to P8 described with reference to FIG. 11, and thus, redundant description thereof will not be repeated.

As described with reference to FIG. 11, in the seventh period P7, the node voltage of the first control node Q may be initialized or reset to a low level by the pulse of the first light emission clock signal EM_CLK1 (that is, by the pulse of the first light emission clock signal EM_CLK1 applied immediately after the second light emission clock signal EM_CLK2 is masked), and the node voltage of the third control node SR_QB may be initialized or reset to a high level.

Further, in the eighth period P8, the second light emission clock signal EM_CLK2 may have a low level pulse, and the node voltage of the first control node Q may be boosted to a level that is lower than the low level by the first capacitor C1, and the first light emission control signal EM1 may be fully shifted to, or maintained at, the low level.

After the first control node Q and the third control node SR_QB are completely initialized (or stabilized), the first and second light emission clock signals EM_CLK1 and EM_CLK2 may be masked until the end of the corresponding frame period or until the end of the second mode MODE2 (or until the start of the first mode MODE1).

As illustrated in FIG. 13, in the ninth period P9, a pulse of the first light emission clock signal EM_CLK1 may be masked, and the first light emission clock signal EM_CLK1 may have a high level. Further, the second light emission clock signal EM_CLK2 may have a high level. Accordingly, the first stage ST1 may maintain the same state as the eighth period P8, the node voltage of the first control node Q may be maintained at a high level, and the first light emission control signal EM1 may be maintained at a low level.

Similarly, in the tenth period P10, a pulse of the second light emission clock signal EM_CLK2 may be masked, and the first and second light emission clock signals EM_CLK1 and EM_CLK2 may have a high level. Accordingly, the first stage ST1 may maintain the same state as the ninth period P9, the node voltage of the first control node Q may be maintained at a high level, and the first light emission control signal EM1 may be maintained at a low level.

That is, after the tenth period P10, when the first and second light emission clock signals EM_CLK1 and EM_CLK2 are masked, the first stage ST1 may continuously maintain the same state as in the eighth period P8, and the first light emission control signal EM1 may be maintained at a low level.

Meanwhile, the first stage ST1 may not perform a toggling operation in response to the light emission clock signals EM_CLK1 and EM_CLK2 maintained at a high level, that is, the transistors T1 to T10 in the first stage ST1 may not repeat the turn-on state and the turn-off state. Accordingly, power consumption of the light emitting driver 150 may be reduced.

Figure 14:
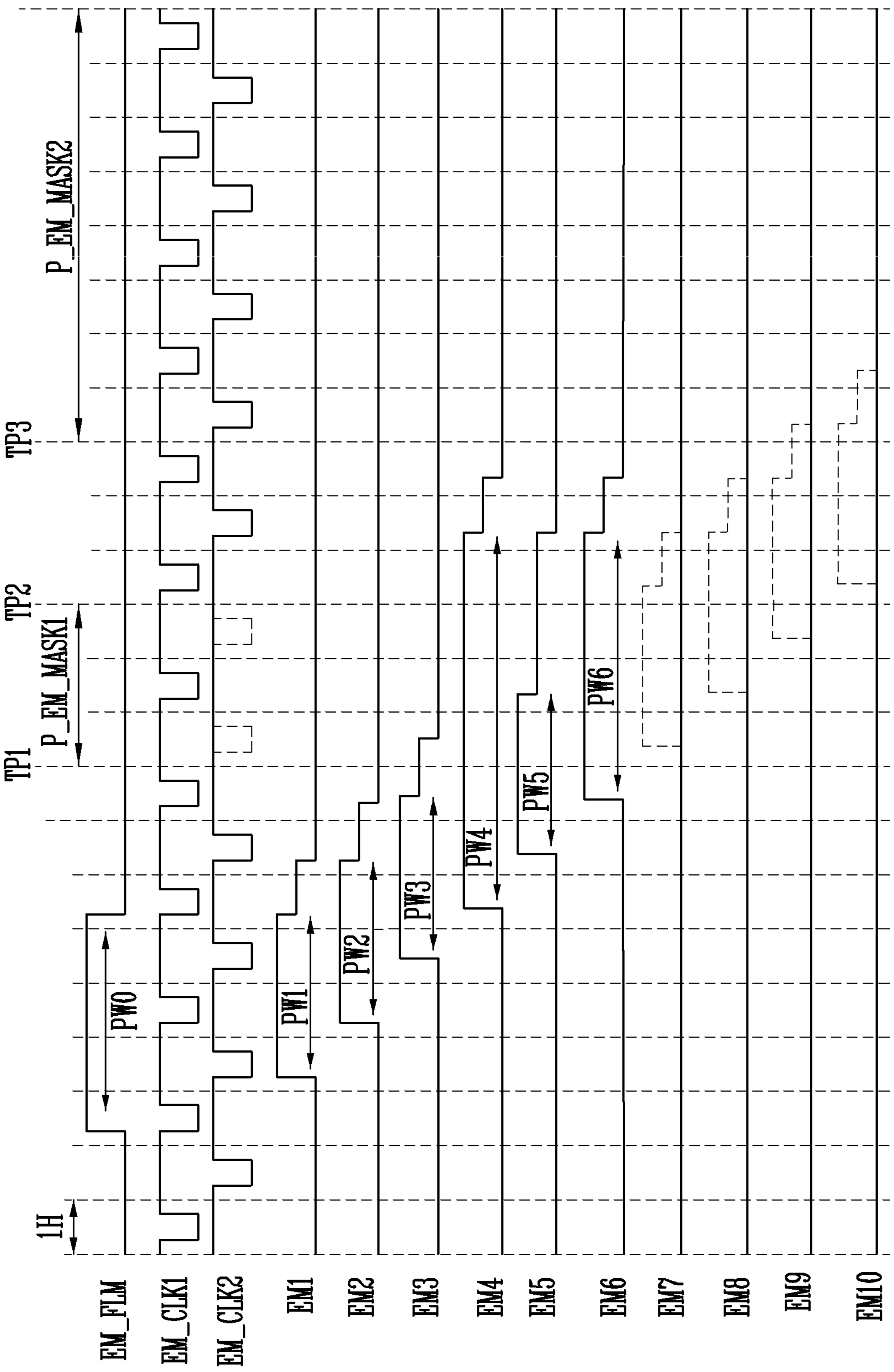
FIG. 14 is a waveform diagram illustrating an example of signals measured by the light emitting driver of FIG. 8.
Figure 15:
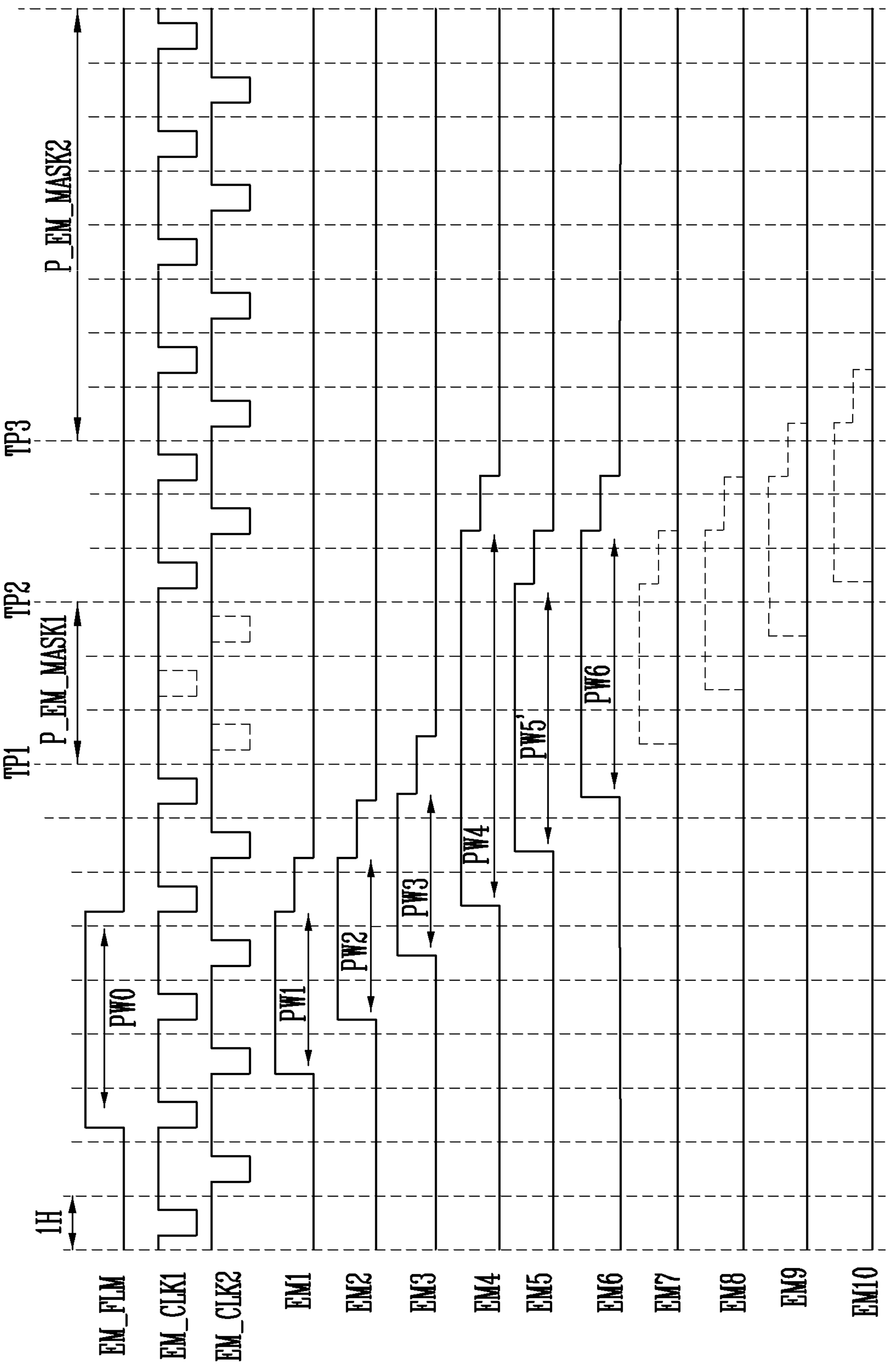
FIG. 15 is a waveform diagram illustrating another example of the signals measured by the light emitting driver of FIG. 8.

FIG. 14 is a waveform diagram illustrating an example of the signals measured by the light emitting driver of FIG. 8. FIG. 15 is a waveform diagram illustrating another example of the signals measured by the light emitting driver of FIG. 8. FIGS. 14 and 15 illustrate the signals measured by the light emitting driver 150 operating in the second mode.

First, referring to FIGS. 8, 10, and 14, the light emission start signal EM_FLM, the first and second light emission clock signals EM_CLK1 and EM_CLK2, and the first to third light emission control signals EM1, EM2, and EM3 are substantially the same as or similar to the light emission start signal EM_FLM, the first and second light emission clock signals EM_CLK1 and EM_CLK2, and the first to third light emission control signals EM1, EM2, and EM3, respectively, and thus, redundant description thereof will not be repeated.

To block an output of a seventh light emission control signal EM7 (and subsequent light emission control signals), the second light emission clock signal EM_CLK2 may be masked in a first masking period P_EM_MASK1 between a first time point TP1 to a second time point TP2.

In this case, the light emission control signals after the seventh light emission control signal EM7 may be changed by the masked second light emission clock signal EM_CLK2.

The fourth stage included in the light emitting driver 150 may output the fourth light emission control signal EM4 by shifting the third light emission control signal EM3 by one horizontal time period 1H.

At a first time point TP1, the node voltage of the first control node Q in the fourth stage has to be shifted to a low level based on a pulse of the second light emission clock signal EM_CLK2 similar to the operation of the first stage ST1 in the seventh period P7 described with reference to FIG. 10. However, the first control node Q in the fourth stage may not be initialized during the first masking period P_EM_MASK1, and the fourth light emission control signal EM4 of a high level may be output during the first masking period P_EM_MASK1. After the second time point TP2 when the first masking period P_EM_MASK1 ends, the node voltage of the first control node Q in the fourth stage may be shifted to a low level based on the pulse of the second light emission clock signal EM_CLK2, and the fourth light emission control signal EM4 of a low level may be output.

The first to third light emission control signals EM1, EM2, and EM3 may respectively have pulse widths PW1, PW2, and PW3 (for example, each being four horizontal time periods) corresponding to a reference pulse width PWO (for example, four horizontal time periods) of the light emission start signal EM_FLM. However, the fourth light emission control signal EM4 may have the fourth pulse width PW4 (for example, eight horizontal time periods) that is greater than the reference pulse width PWO of the light emission start signal EM_FLM.

The fifth stage included in the light emitting driver 150 may output the fifth light emission control signal EM5 by shifting the fourth light emission control signal EM4 by one horizontal time period 1H.

The node voltage of the first control node Q in the fifth stage may be shifted to a low level based on the pulse of the first light emission clock signal EM_CLK1 in the first masking period P_EM_MASK1. Subsequently, the node voltage of the first control node Q in the fifth stage may be boosted to a voltage level that is lower than the low level by the second light emission clock signal EM_CLK2 after the second time point TP2, and the fifth light emission control signal EM5 may be fully shifted to the low level.

A fifth pulse width PW5 of the fifth light emission control signal EM5 may be substantially the same as the third pulse width PW3 of the third light emission control signal EM3.

However, as illustrated in FIG. 15, when the pulse of the first light emission clock signal EM_CLK1 is masked in the first masking period P_EM_MASK1, the node voltage of the first control node Q in the fifth stage may not be shifted to a low level. After the second time point TP2, the node voltage of the first control node Q in the fifth stage may be shifted to the low level based on the pulse of the second light emission clock signal EM_CLK2. In this case, a fifth pulse width PW5' of the fifth light emission control signal EM5 may be greater than the third pulse width PW3 of the third light emission control signal EM3, and may be approximately six horizontal time periods.

Referring back to FIG. 14, the sixth stage included in the light emitting driver 150 may output the sixth light emission control signal EM6 by shifting the fifth light emission control signal EM5 by one horizontal time period 1H.

Similar to the fourth stage, the first control node Q in the sixth stage may not be initialized during the first masking period P_EM_MASK1, and the sixth light emission control signal EM6 of a high level may be output during the first masking period P_EM_MASK1. After the second time point TP2 when the first masking period P_EM_MASK1 ends, the node voltage of the first control node Q in the sixth stage may be shifted to a low level based on the pulse of the second light emission clock signal EM_CLK2, and the sixth light emission control signal EM6 of the low level may be output.

A sixth pulse width PW6 of the sixth light emission control signal EM6 may be greater than the third pulse width PW3 of the third light emission control signal EM3, and may be approximately six horizontal time periods.

The seventh light emission control signal EM7 and the subsequent light emission control signals EM8, EM9, and EM10 may have a low level similar to the first to third light emission control signals EM1, EM2, and EM3 described with reference to FIG. 11.

As described with reference to FIG. 14, when the second light emission clock signal EM_CLK2 is masked to skip a light emission control signal (for example, the seventh light emission control signal EM7) of a suitable light emission control line, pulse widths (for example, the fourth to sixth pulse widths PW4 to PW6 of the fourth to sixth light emission control signals EM4 to EM6) of the light emission control signals of one or more previous light emission control lines may be changed.

Accordingly, the display device according to the present embodiments may adjust a masking time point of the light emission clock signals EM_CLK1 and EM_CLK2 in relation to a data signal (and/or scan signal), or may compensate for the data signal (or grayscale value) in response to the light emission control signals with change pulse widths. Accordingly, it is possible to reduce or prevent reduction in display quality of an image displayed on the display 110.

Meanwhile, FIGS. 14 and 15 illustrate that the first and second light emission clock signals EM_CLK1 and EM_CLK2 are not masked after the first masking period P_EM_MASK1, but the present disclosure is not limited thereto. Similar to the ninth and tenth periods P9 and P10 described with reference to FIG. 13, the first and second light emission clock signals EM_CLK1 and EM_CLK2 may be masked during the second masking period P_EM_MASK2 after the third time point TP3.

Figure 16:
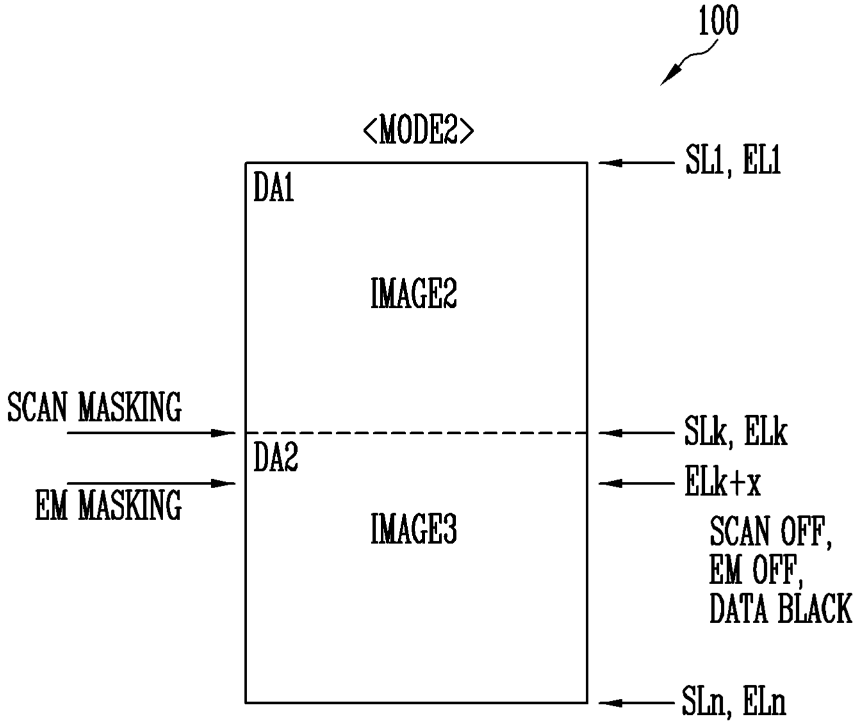
FIG. 16 is a diagram illustrating an example of the display device of FIG. 1 operating in the second mode.
Figure 17:
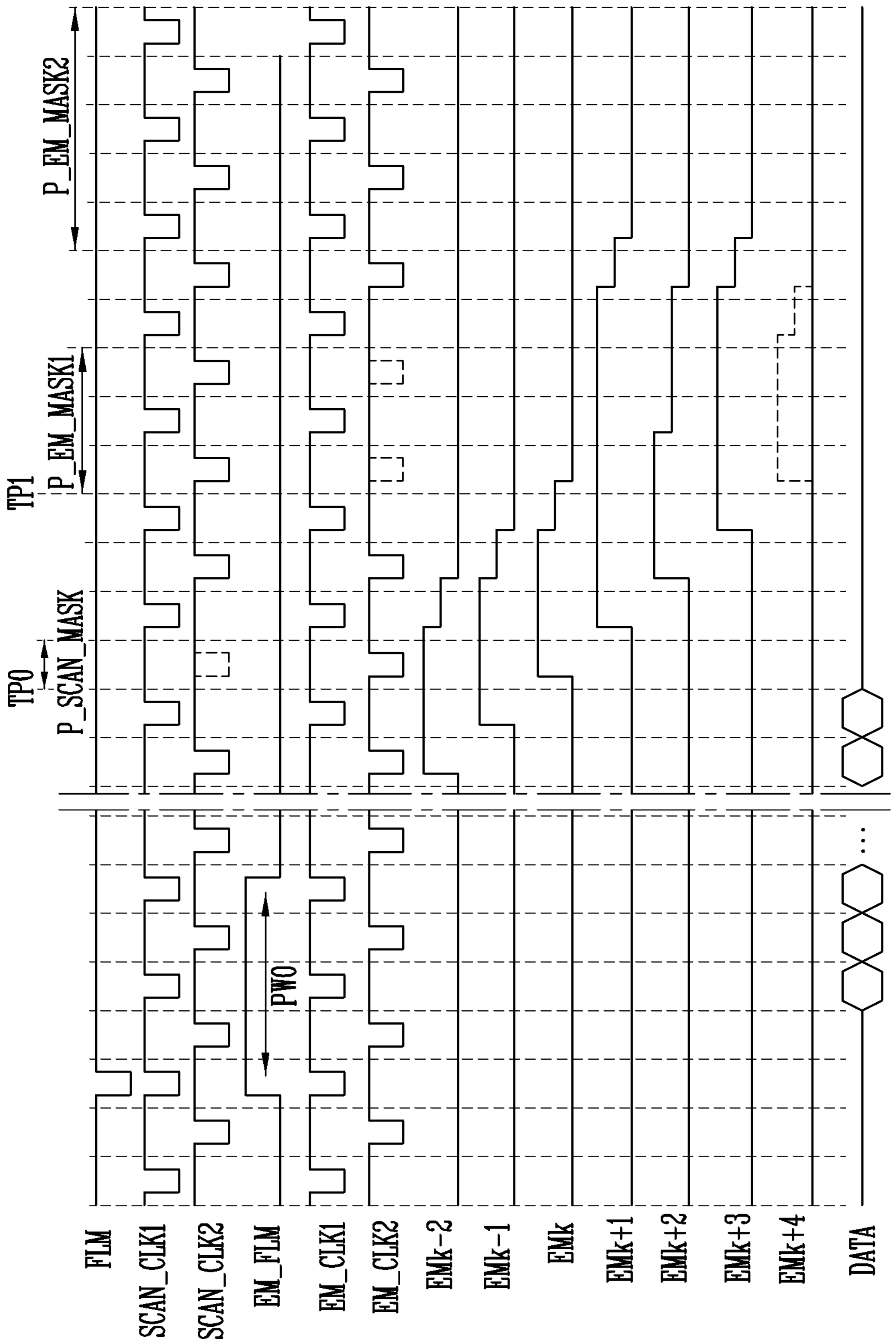
FIG. 17 is a waveform diagram illustrating an example of signals measured by the display device of FIG. 16.

FIG. 16 is a diagram illustrating an example of the display device of FIG. 1 operating in the second mode. FIG. 17 is a waveform diagram illustrating an example of the signals measured by the display device of FIG. 16.

First, referring to FIGS. 2 and 16, the display device 100 illustrated in FIG. 16 may be substantially the same as the display device 100 in FIG. 2 except for a masking time point SCAN MASKING of the scan clock signal and a masking time point EM MASKING of the light emission clock signal. Thus, redundant description thereof will not be repeated.

Referring to FIGS. 14 and 17, the light emission start signal EM_FLM, the first and second light emission clock signals EM_CLK1 and EM_CLK2, and the (k−2)-th to (k+4)-th light emission control signals EM(k−2) to EM(k+4) are substantially the same as, or similar to, the light emission start signal EM_FLM, the first and second light emission clock signals EM_CLK1 and EM_CLK2, and the first to eighth light emission control signals EM1 to EM8, and thus, redundant description thereof will not be repeated.

Similar to the light emitting driver 150 described with reference to FIGS. 8 to 11, the scan driver 120 may shift (for example, shift by one horizontal time period) the scan start signal FLM by using the first and second scan clock signals SCAN_CLK1 and SCAN_CLK2 illustrated in FIG. 17 and sequentially provide a scan signal to the first to nth scan lines SL1 to SLn.

The scan start signal FLM may have a pulse width (for example, a pulse width of one horizontal time period) that is smaller than cycles of the first and second scan clock signals SCAN_CLK1 and SCAN_CLK2, and the scan signal may not overlap a previous scan signal or a subsequent scan signal. Accordingly, even if the first and second scan clock signals SCAN_CLK1 and SCAN_CLK2 are masked, a change in the pulse width of the scan signal may not be made.

As illustrated in FIG. 17, the data signal DATA may have a valid value until a reference time point TP0, and the data signal DATA may have a reference voltage (that is, a voltage level corresponding to a black grayscale value) after the reference time point TP0.

In this case, the timing controller 140 may determine to cut off a supply of the scan signal SCAN to a period after the reference time point TP0, that is, may determine to cut off a supply of the scan signal SCAN to the k-th to n-th scan lines SLk to SLn.

Thereby, the second scan clock signal SCAN_CLK2 may be masked in the scan masking period P_SCAN_MASK including the reference time point TP0. Meanwhile, this is an example, and the first scan clock signal SCAN_CLK1 may be masked instead of the second scan clock signal SCAN_CLK2 after the reference time point TP0.

Meanwhile, the light emission clock signals EM_CLK1 and/or EM_CLK2 may be masked from the first time point TP1 where a suitable time elapses from the scan masking period P_SCAN_MASK during the first masking period P_EM_MASK1. For example, a pulse of the second light emission clock signal EM_CLK2 may be masked from the first time point where time elapses by the reference pulse width PWO (for example, four horizontal time periods) of the light emission start signal EM_FLM from the reference time point TP0 during the first masking period P_EM_MASK1 (for example, three horizontal time periods).

In this case, the (k+4)-th light emission control signal EM(k+4) may have only a low level, the pulse widths PW4 to PW6 of the (k+1)-th to (k+3)-th light emission control signals EM(k+1) to EM(k+3) may be changed, and the third pulse width PW3 of the kth light emission control signal EM(k) and the pulse widths of the previous light emission control signals EM(k−1), EM(k−2), and the like may correspond to the reference pulse width PW0.

However, the (k+1)-th to (k+3)-th light emission control lines to which the (k+1)-th to (k+3)-th light emission control signals EM(k+1) to EM(k+3) are applied may be included in the second display region DA2 illustrated in FIG. 16. For example, when a black image is displayed in the second display region DA2, a luminance change or a degradation of display quality caused by the (k+1)-th to (k+3)-th light emission control signals EM(k+1) to EM(k+3) may not be visually recognized by a user.

In view of a margin, the display device 100 (or the timing controller 140) may mask at least one pulse of the light emission clock signals EM_CLK1 and EM_CLK2 at a time point corresponding to the (k+x)-th light emission control line ELk+x that is later by x from the kth light emission control line ELk (e.g., that is x lines after the kth light emission control line ELk). Here, x may be greater than or equal to PWO/1H, and for example, x may be similar to the reference pulse width PWO of the light emission start signal EM_FLM.

The masking time point EM MASKING of the light emission clock signal that may increase or maximize a reduction in power consumption of the display device 100 without degrading a display quality will be described in detail with reference to FIG. 18.

Figure 18:
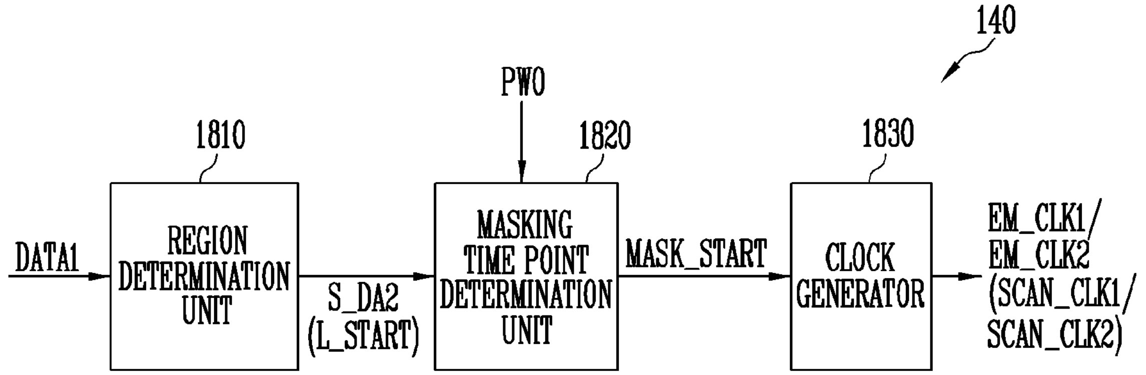
FIG. 18 is a block diagram illustrating an example of a timing controller included in the display device of FIG. 1.

FIG. 18 is a block diagram illustrating an example of the timing controller included in the display device of FIG. 1.

Referring to FIGS. 1, 16, and 18, the timing controller 140 may include a region determination unit/region determiner 1810, a masking time point determination unit/masking time point determiner 1820, and a clock generator 1830. Each of the region determiner 1810, the masking time point determiner 1820, and the clock generator 1830 may be configured as a logic circuit.

The region determiner 1810 may determine the second display region DA2 in which a still image or a black image is displayed by comparing the current frame data and the previous frame data included in the input image data DATA1. For example, the region determiner 1810 may differentially calculate the current frame data and the previous frame data, and may determine a region having a differential calculation result that is less than or equal to a reference value as the second display region DA2. The region determiner 1810 may generate information S_DA2 on the second display region DA2 or information L_START (for example, SLk) on a start line of the second display region DA2.

The masking time point determiner 1820 may generate a masking signal MASK_START (or a masking start signal), which is based on the information S_DA2 (or based on information L_START on a start line), for the second display region DA2, and may generate the reference pulse width PW0 of the light emission start signal EM_FLM.

The number of light emission control lines affected by a masking operation for the light emission clock signals EM_CLK1 and EM_CLK2 may be equal to reference pulse width of the light emission start signal EM_FLM (PW0) divided by 1 horizontal time period (1H) less 1 (e.g., (PWO/1H)−1). For example, when the reference pulse width PW0 is 4, the number of light emission control lines affected by the masking operation may be 3. In this case, the masking time point determiner 1820 may generate the masking signal MASK_START such that the light emission clock signals EM_CLK1 and EM_CLK2 may be masked at a time point corresponding to "start line+3+a margin of the second display region DA2".

In one embodiment, the pulse width (or the changed pulse width) of the light emission control signal applied to each of the light emission control lines affected by the masking operation may be calculated.

Referring to FIG. 14, for example, when only the second light emission clock signal EM_CLK2 is masked, the pulse width of the light an emission control signal (for example, the fourth light emission control signal EM4) of the first light emission control line affected by the masking operation may be "PW0×2". The pulse width of the light emission control signal (for example, the fifth light emission control signal EM5) of the second light emission control line affected by the masking operation may be "PW0". The pulse width of the light emission control signal (for example, the sixth light emission control signal EM6) of the third light emission control line affected by the masking operation may be equal to "PW0×3/2". Further, when there are four or more light emission control lines affected by the masking operation, the pulse width of each of the fourth light emission control line and the subsequent light emission control lines may be "PW0×3/2" in the same manner as the pulse width of the third light emission control line.

Meanwhile, referring to FIG. 15, for example, when both of the first and second light emission clock signals EM_CLK1 and EM_CLK2 are masked, the pulse width of the light emission control signal (for example, the fourth light emission control signal EM4) of the first light emission control line affected by the masking operation may be "PW0×2". The pulse width of the light emission control signal (for example, the fifth light emission control signal EM5) of the second light emission control line affected by the masking operation may be "PW0×3/2". Further, the pulse width of the light emission control signal (for example, the sixth light emission control signal EM6) of the second and subsequent light emission control lines affected by the masking operation may be equal to "PW0×3/2".

The changed pulse width of the light emission control signal of the light emission control line affected by the masking operation may be previously stored and used for data compensation, which will be described below with reference to FIG. 18.

Referring back to FIG. 18, the clock generator 1830 may generate the light emission clock signals EM_CLK1 and EM_CLK2 and may mask at least one pulse of the light emission clock signals based on the masking signal MASK_START. Referring to FIG. 17, for example, the clock generator 1830 may mask the second light emission clock signal EM_CLK2 in the first masking period P_EM_MASK1. Further, in the second masking period P_EM_MASK2 separated from the first masking period P_EM_MASK1, the clock generator 1830 may mask the first and second light emission clock signals EM_CLK1 and EM_CLK2.

As described with reference to FIG. 18, by determining an optimal or suitable masking time point of the light emission clock signals EM_CLK1 and EM_CLK2 based on the reference pulse width PW0 of the light emission start signal EM_FLM, a reduction in power consumption of the display device 100 may be maximized while reducing or preventing degradation of display quality.

Figure 19:
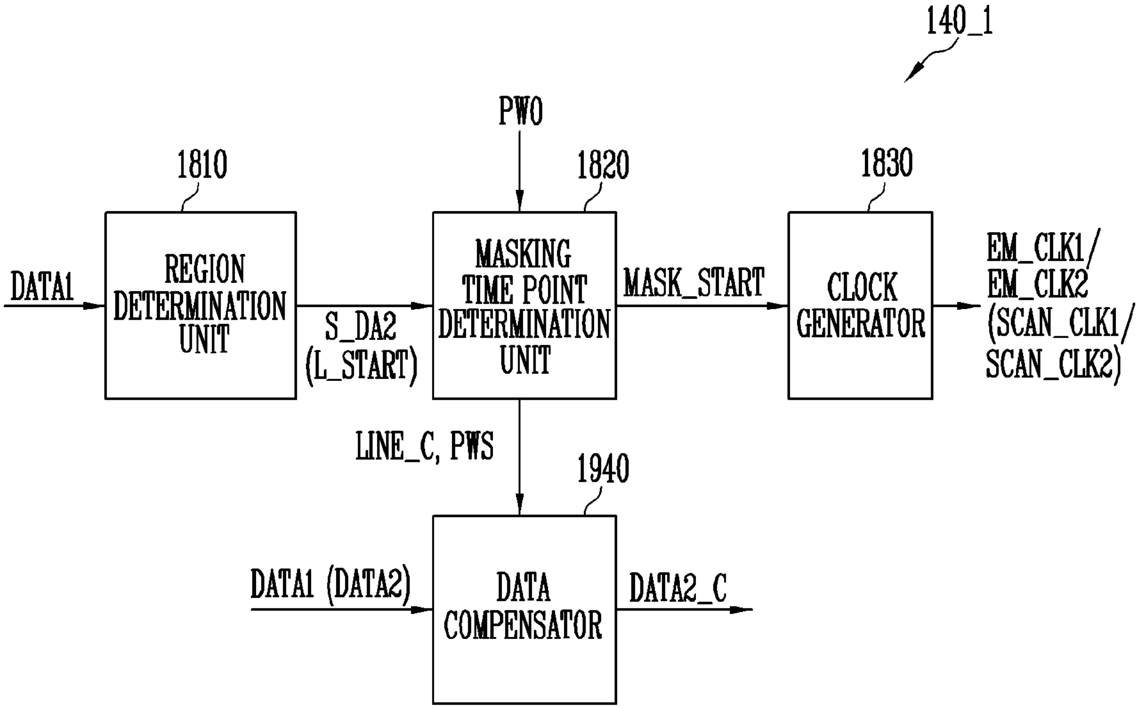
FIG. 19 is a block diagram illustrating another example of the timing controller included in the display device of FIG. 1.

FIG. 19 is a block diagram illustrating another example of the timing controller included in the display device of FIG. 1.

Referring to FIGS. 18 and 19, a timing controller 140_1 of FIG. 19 may be substantially the same as or similar to the timing controller 140 described with reference to FIG. 18 except for the addition of a data compensator 1940. Thus, redundant description thereof will not be repeated.

The masking time point determiner 1820 may also determine the masking time point of the scan clock signal and the masking time point of the light emission clock signal in the same manner.

Further, the masking time point determiner 1820 may determine a compensation period LINE_C in which the pulse width of the light emission clock signal varies based on the masking signal MASK_START. Here, the compensation period LINE_C may be a period (or time) in which the light emission control signal of the light emission control line affected by the masking operation are output.

The data compensator 1940 may compensate for partial data corresponding to a compensation period LINE_C) of the input image data DATA1 (or the image data DATA2) based on a changed pulse width PWS of the light emission control signal of the light emission control line affected by the masking operation, thereby, generating the compensated data DATA2_C. For example, the data compensator 1940 may increase a grayscale value in proportion to the changed pulse width PWS. As another example, a luminance reduction rate may be calculated based on the pulse width PWS, and the grayscale value may be compensated based on the luminance reduction rate.

The compensated data DATA2_C may be provided to the data driver 130, and the data driver 130 may generate data signals based on the compensated data DATA2_C.

As described with reference to FIG. 19, pulse widths of some of the light emission clock signals adjacent to a time point at which the light emission clock signal is masked may be changed, but by partially compensating for the image data corresponding to the changed pulse width, a reduction in power consumption may be improved or maximized while preventing a quality from degrading.

In some embodiments, the timing controller 140 may periodically switch between the first mode and the second mode to display an image on the display 110 with multiple frequencies at the same time.

Figure 20:
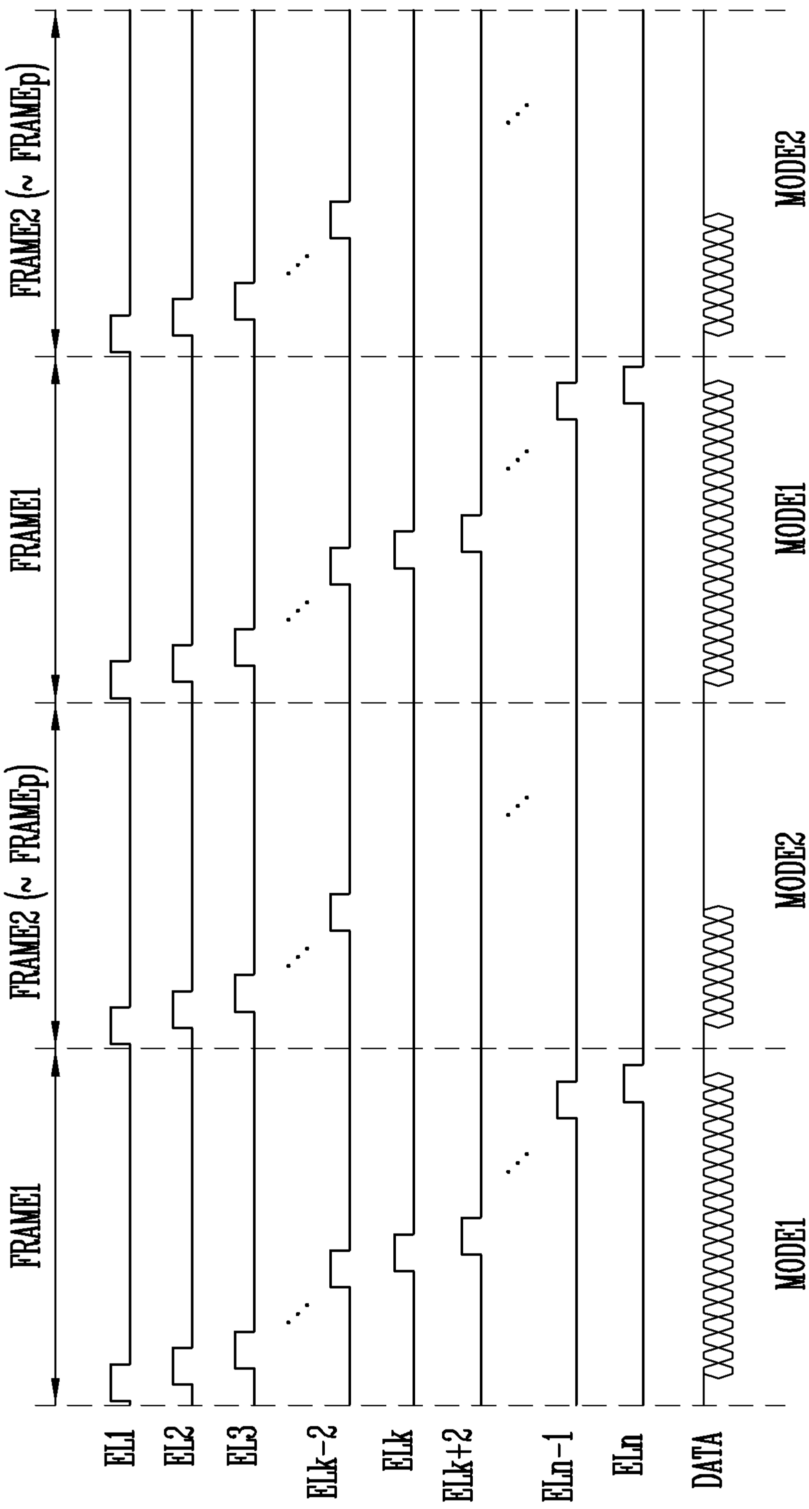
FIG. 20 is a waveform diagram illustrating an operation of the display device of FIG. 1.

FIG. 20 is a waveform diagram illustrating an operation of the display device of FIG. 1.

Referring to FIGS. 1 and 20, data signals may have valid values in the entire first frame FRAME1 (or the first frame period).

In this case, in the first frame FRAME1, the timing controller 140 may operate in the first mode MODE1, and may generate light emission clock signals and scan clock signals without a masking operation. Thereby, the light emission control signals having a high level pulse may be sequentially applied to the first to nth light emission control lines EL1 to ELn.

The data signals may have valid values in some periods of a second frame FRAME2 (or the second frame period), and the data signals may have invalid values in the remaining periods of the second frame FRAME2.

In this case, in the second frame FRAME2, the timing controller 140 operates in the second mode MODE2, and as described with reference to FIG. 18, the timing controller may determine a masking time point (and a masking time point of the scan clock signals) and may partially mask the light emission clock signals (and scan clock signals) at a suitable time point (or for a suitable period) of the second frame FRAME2. Thereby, the light emission control signals having a high level pulse may be sequentially applied to the first to (k−1)-th light emission control lines EL1 to ELk−1, and the light emission control signal having only a low level (that is, in a form of direct current) may be applied to the k-th to n-th light emission control lines ELk to ELn.

When the first frame FRAME1 and the second frame FRAME2 are alternately repeated, an image having a drive frequency (for example, 60 Hz) that is half of a drive frequency (for example, 120 Hz) of the first display region DA1, which corresponds to the first to (k−1)-th light emission control lines EL1 to ELk−1, may be displayed in the second display region DA2 (see FIG. 2) corresponding to the k-th to n-th light emission control lines ELk to ELn.

During the second frame FRAME2 to p-th frame FRAMEp, when the timing controller 140 operates in the second mode MODE2, an image may be displayed with a lower frequency in the second display region DA2 (see FIG. 2). For example, when p is 120, an image having a frequency of 1 Hz may be displayed in the second display region DA2 (see FIG. 2).

Meanwhile, to further reduce power consumption, the display device 100 may commonly generate and output a data signal for the second display region DA2 (see FIG. 2) while operating in the second mode MODE2.

Figure 21:
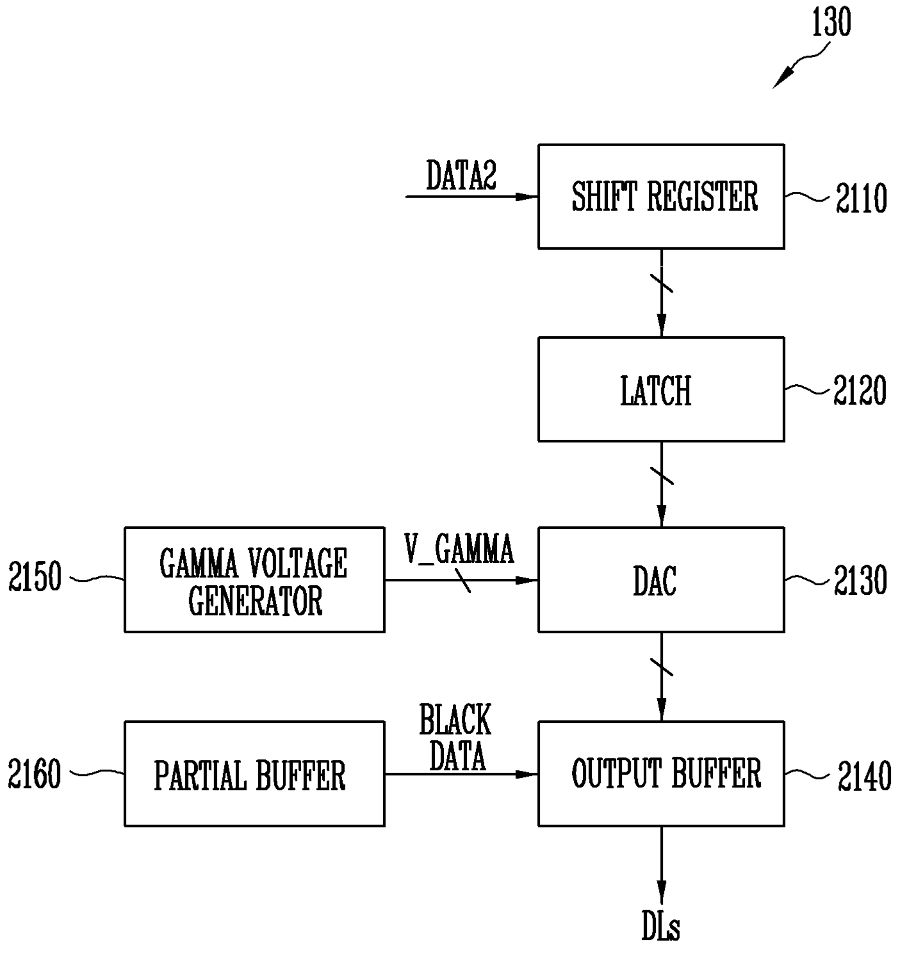
FIG. 21 is a block diagram illustrating an example of a data driver included in the display device of FIG. 1.

FIG. 21 is a block diagram illustrating an example of the data driver included in the display device of FIG. 1.

Referring to FIG. 21, the data driver 130 may include a shift register 2110, a latch 2120, a decoder 2130 (or a digital-analog converter DAC), an output buffer 2140, a gamma voltage generator 2150, and a common buffer (partial buffer) 2160.

The shift register 2110 may provide the latch 2120 with image data DATA2 received from the timing controller 140 in parallel. The shift register 2110 may generate a latch clock signal to provide the latch with the latch clock signal, and the latch clock signal may be used to control timing when parallelized data is output.

The latch 2120 may latch or temporarily store the data sequentially received from the shift register 2110 and transfer the data to the decoder 2130.

The decoder 2130 may convert digital data (that is, a grayscale value of the parallelized data DATA) into an analog data signal (or data voltage) using a gamma voltage V_GAMMA.

The output buffer 2140 may receive the data signal and output the data signal to data lines DLs (that is, data lines DL1 to DLm of the display 110 described with reference to FIG. 1). The output buffer 2140 may include source buffers connected to the data lines DLs.

The output buffer 2140 may alternately or selectively output the data signal and a common voltage provided from the common buffer 2160 in the second mode.

The gamma voltage generator 2150 may generate gamma voltages VG0 to VG2047 of various voltage levels.

The gamma voltage generator 2150 may include gamma buffers that transmit representative gamma voltages to a resistor string and taps of the resistor string. The gamma voltage generator 2150 may be a digital gamma voltage generator. In this case, gamma voltages output from the gamma voltage generator 2150 may be linear.

The common buffer 2160 may output one gamma voltage provided from the gamma voltage generator 2150 as a common voltage (for example, a data voltage BLACK DATA corresponding to a black grayscale).

Figure 22:
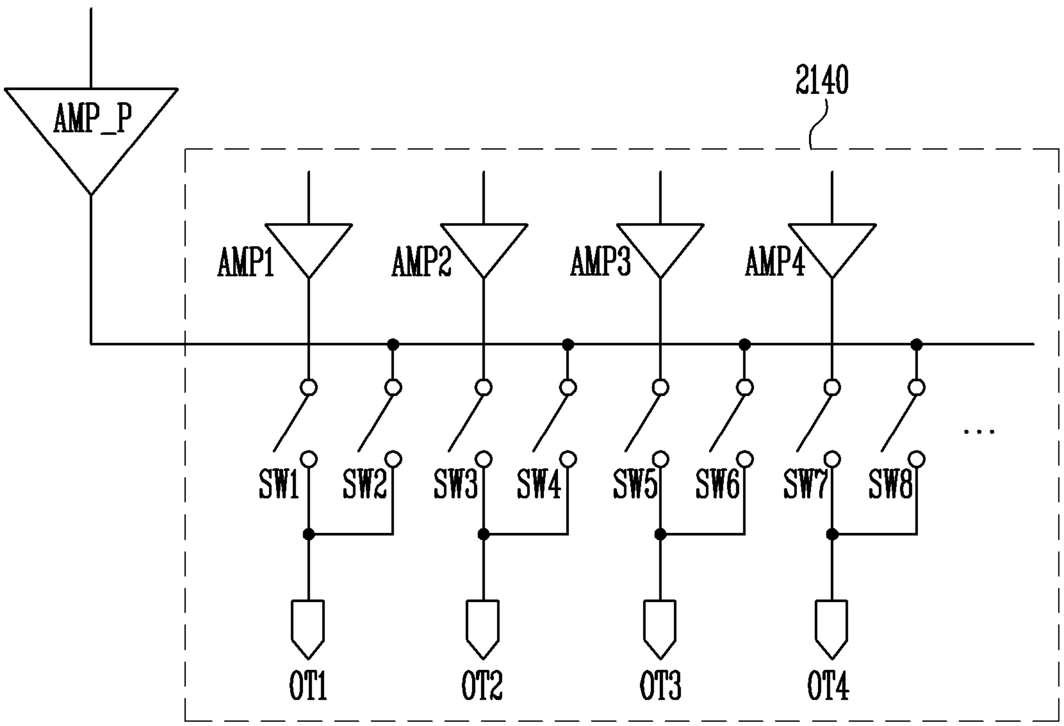
FIG. 22 is a circuit diagram illustrating an example of an output buffer included in the data driver of FIG. 21.

FIG. 22 may be used as a reference to describe a configuration of the output buffer 2140.

FIG. 22 is a circuit diagram illustrating an example of an output buffer included in the data driver of FIG. 21.

Referring to FIG. 22, the output buffer 2140 may include source buffers AMP1, AMP2, AMP3, and AMP4 and switches SW1 to SW8. A power amplifier AMP_P may represent an example of the common buffer 2160 illustrated in FIG. 21.

The first source buffer AMP1 may be connected to a first output terminal OT1 through the first switch SW1, and for example, the first output terminal OT1 may be connected to a first data line DL1 (see FIG. 1).

The second switch SW2 may be connected between an output terminal of the power amplifier AMP_P and the first output terminal OT1.

Similarly, the second source buffer AMP2 may be connected to a second output terminal OT2 through the third switch SW3, and for example, the second output terminal OT2 may be connected to the second data line DL2 (see FIG. 1).

The fourth switch SW4 may be connected between the output terminal of the power amplifier AMP_P and the second output terminal OT2.

The third source buffer AMP3 may be connected to a third output terminal OT3 through the fifth switch SW5, and the sixth switch SW6 may be connected between the output terminal of the power amplifier AMP_P and the third output terminal OT3.

The fourth source buffer AMP4 may be connected to a fourth output terminal OT4 through the seventh switch SW7, and the eighth switch SW8 may be connected between the output terminal of the power amplifier AMP_P and the fourth output terminal OT4.

When the data driver 130 operates in the first mode, the first, third, fifth, and seventh switches SW1, SW3, SW5, and SW7 may be turned on and the data signals may be output to the data lines from the output terminals OT1 to OT4 through the source buffers AMP1 to AMP4.

When the data driver 130 operates in the second mode, the first, third, fifth, and seventh switches SW1, SW3, SW5, and SW7 may be turned on in some periods of the frame, and the data signals may be output to the data lines from the output terminals OT1 to OT4 through the source buffers AMP1 to AMP4. In the remaining periods of the frame, the second, fourth, sixth, and eighth switches SW2, SW4, SW6, and SW8 may be turned on, and a common voltage may be output through one power amplifier AMP_P. In this case, a supply of a bias current to the source buffers AMP1 to AMP4 may be cut off and power consumption due to operations of the source buffers AMP1 to AMP4 may be reduced.

Although the technical idea of the present disclosure is described in detail according to the above-described embodiments, it should be noted that the embodiments are for the purpose of description and not of limitation. Further, those skilled in the art of the present disclosure will understand that various modification examples may be made within the scope of the technical idea of the present disclosure.

The scope of the present disclosure is not limited to the content described in the detailed specification and should be defined by the claims. Further, it is to be construed that all changes or modification examples derived from the meaning and scope of the claims and equivalent concepts thereof are included in the scope of the present disclosure.

What is claimed is:

1. A driver configured to:

output a clock signal for a display comprising pixels;

output the clock signal including a first number of pulses during a frame period in a first mode;

output the clock signal including a second number of pulses different from the first number during a frame period in a second mode such that an image of a first area of the display is updated and a non-black still image of a second area of the display, which is different from the updated image of the first area, is not updated while the non-black still image of the second area continues to be displayed;

periodically perform mode switching between the first mode and the second mode such that the first and second areas of the display respectively display images at different refresh rates; and skip at least one pulse of the clock signal in the second mode such that the second number of pulses in the second mode is less than the first number of pulses in the first mode, and such that a second frequency of the clock signal in the second mode is less than a first frequency of the clock signal in the first mode, wherein a timing of skipping the at least one pulse of the clock signal is determined according to a start line of the second area.

2. The driver according to claim 1, wherein the driver is further configured to periodically output a vertical synchronization signal or a start signal, and wherein the frame period is defined by the vertical synchronization signal or the start signal.

3. The driver according to claim 1, wherein a pulse width of the second number of pulses of the clock signal in the second mode is equal to a pulse width of the first number of pulses of the clock signal in the first mode.

4. The driver according to claim 3, wherein a width of the frame period in the second mode is equal to a width of the frame period in the first mode.

5. The driver according to claim 1, wherein in the second mode:

the driver is configured to output the second number of pulses of the clock signal in a first period of the frame period;

the driver is configured to output a Direct Current signal as the clock signal in a second period of the frame period; and a width of the second period is greater than a cycle of the clock signal in the first period.

6. The driver according to claim 1, wherein the clock signal comprises a first clock signal and a second clock signal obtained by delaying a phase of the first clock signal, and wherein the driver is configured to skip the at least one pulse of at least one of the first and second clock signals.

7. The driver according to claim 6, wherein the driver is configured to skip the at least one pulse of each of the first and second clock signals.

8. The driver according to claim 7, wherein a number of skipped pulses of the second clock signal is different from a number of skipped pulses of the first clock signal.

9. The driver according to claim 1, wherein the driver is configured to discontinuously skip the at least one pulse of the clock signal over two or more times.

10. The driver according to claim 1, wherein the clock signal comprises a scan clock signal and a light emission clock signal different from the scan clock signal, wherein the driver is configured to skip at least one pulse of the scan clock signal and at least one pulse of the light emission clock signal, and wherein a timing of skipping the at least one pulse of the light emission clock signal is different from a timing of skipping the at least one pulse of the scan clock signal.

11. The driver according to claim 10, wherein the driver is configured to skip a pulse of the scan clock signal at a first time point and to skip a pulse of the light emission clock signal after at least one cycle of the scan clock signal from the first time point.

12. The driver according to claim 1, wherein the driver is configured to operate in the first mode for one frame period and to operate in the second mode for at least one frame period.

13. A display device comprising:

a display comprising pixels connected to gate lines;

a gate driver configured to provide gate signals to the gate lines based on a clock signal having pulses; and a timing controller configured to:

provide the clock signal to the gate driver;

output the pulses of the clock signal during a first frame in a first mode;

skip at least one pulse of the pulses during a second frame in a second mode, such that an image of a first area of the display is updated and a non-black still image of a second area of the display, which is different from the updated image of the first area, is not updated while the non-black still image of the second area continues to be displayed, such that a second number of pulses in the second mode is less than a first number of pulses in the first mode, and such that a second frequency of the clock signal in the second mode is less than a first frequency of the clock signal in the first mode; and periodically perform mode switching between the first mode and the second mode such that the first and second areas of the display respectively display images at different refresh rates;

wherein a timing of skipping the at least one pulse of the clock signal is determined according to a start line of the second area.

14. The display device according to claim 13, wherein in the second mode:

the timing controller is configured to output the pulses of the clock signal in a first period of the second frame;

the timing controller is configured to output a Direct Current signal as the clock signal in a second period of the second frame; and a width of the second period is greater than a cycle of the clock signal in the first period.

15. The display device according to claim 14, wherein the clock signal comprises a first clock signal and a second clock signal obtained by delaying a phase of the first clock signal, and wherein the timing controller is configured to skip the at least one pulse of at least one of the first and second clock signals.

16. The display device according to claim 13, wherein, while the second mode is maintained, the second frame is repeated a plurality of times.

17. The display device according to claim 13, further comprising:

a scan driver configured to generate scan signals based on a scan clock signal and to provide the scan signals to the pixels through scan lines, wherein the timing controller is configured to provide the scan clock signal to the scan driver, and to skip a pulse of the scan clock signal such that a supply of respective ones of the scan signals is cut off for fewer than all of the scan lines in the second frame in the second mode.

18. The display device according to claim 17, wherein a second time point at which the timing controller skips the at least one pulse of the clock signal is later than a first time point at which the timing controller skips the pulse of the scan clock signal.

19. The display device according to claim 17, further comprising:

a data driver configured to provide data signals to the pixels through data lines, wherein the data driver is configured to provide a data voltage corresponding to a black grayscale at which the pulse of the scan clock signal is skipped.

* * * * *